US007065493B1

(12) United States Patent
Homsi

(10) Patent No.: US 7,065,493 B1
(45) Date of Patent: Jun. 20, 2006

(54) WORKFLOW SYSTEM AND METHOD

(75) Inventor: Alexandre El Homsi, Paris (FR)

(73) Assignee: International Business Machines Corporation, Armonk, NY (US)

(*) Notice: Subject to any disclaimer, the term of this patent is extended or adjusted under 35 U.S.C. 154(b) by 1075 days.

(21) Appl. No.: 09/828,596

(22) Filed: Apr. 6, 2001

Related U.S. Application Data

(60) Provisional application No. 60/281,914, filed on Apr. 5, 2001, provisional application No. 60/194,932, filed on Apr. 6, 2000.

(51) Int. Cl.
*G06Q 10/00* (2006.01)
(52) U.S. Cl. .............................................. 705/8; 705/9
(58) Field of Classification Search ................... 705/8; 75/8

See application file for complete search history.

(56) References Cited

U.S. PATENT DOCUMENTS

| 5,486,995 | A | * | 1/1996 | Krist et al. .................... 700/29 |
| 5,721,913 | A | * | 2/1998 | Ackroff et al. .......... 707/103 R |
| 5,774,661 | A | * | 6/1998 | Chatterjee et al. ........... 709/203 |
| 5,826,239 | A | * | 10/1998 | Du et al. ........................ 705/8 |
| 5,862,203 | A | * | 1/1999 | Wulkan et al. ......... 379/114.02 |
| 5,999,911 | A | * | 12/1999 | Berg et al. ....................... 705/9 |
| 6,397,191 | B1 | * | 5/2002 | Notani et al. ................... 705/9 |
| 6,574,605 | B1 | * | 6/2003 | Sanders et al. ................. 705/8 |

FOREIGN PATENT DOCUMENTS

JP 11316780 A * 11/1999

OTHER PUBLICATIONS

Van der Aalst, W.M.P., "The Application of Petri Nets to Workflow Management", 1998, The Journal of Circuits, Systems, and Computers, pp. 1-53.*
Business Wire, "Aspen Technology Introduces Aspen Engineering Suite", May 1998, p5041195, pp. 1-4.*
Koulopolous, Thomas; Palmer, Nathaniel, "High End Workflow", Jun. 1994, PC Magazine, v13n11, pp. 1-9.*
"Business Process and Workflow: where technology and management come together", Feb. 1996, Computer Conference Analysis Newsletter, n380, p. 1.*

(Continued)

Primary Examiner—Tariq R. Hafiz
Assistant Examiner—Jonathan G Sterrett
(74) Attorney, Agent, or Firm—Stephen T. Keohane; Hoffman, Warnick & D'Alessandro LLC

(57) ABSTRACT

A network-enabled workflow system is used in conjunction with a rules-based search engine to provide an easy-to-use interface to build workflow processes that facilitate the support for electronic business applications as well as business-to-business relationships. The system allows workflow services to be rendered to external organizations such as partners, suppliers, distributors and customers. Workflow services are preferably represented by roles that can be used to represent workflow actors in the workflow routing rules. These roles are preferably evaluated at run-time to best match recipients (via the MORSE algorithm) depending on the organization context from which the routing request is made. Furthermore, the network-enabled workflow system provides for the analysis of workflow processes in real time.

23 Claims, 39 Drawing Sheets

OTHER PUBLICATIONS

"Workflow: Control is Key", Sep. 1992, RELease 1.0, v92, n9, p. 10.*

"Features to Evaluate When Shopping for Workflow Software", Jan. 1996, Financial Services Report, v13, n2, pp. 1-3.*

"Tips for Selecting a Workflow Tool", Jan. 1996, Data Channels, v23, n1, pp. 1-5.*

"Section 8: Computer Management Systems", Jul. 1998, Printing Impressions, v41, n2, p. 332.*

Dilger, Karen Abramic, "Everyone wants in", Jul. 1998, Manufacturing Systems, v16n7, pp. 108-142.*

Business Wire, "Aspen Technology Releases Aspen Plus 10.0", Apr. 1998, p. 4201233.*

* cited by examiner

| Composed Role | Evaluation Result | Remarks |
|---|---|---|
| {"Philip Collins/TRILOG"} | Philip Collins/TRILOG | This is equivalent to choosing a static user from your Name and Address Book. |
| Line Manager ({"Philip Collins/TRILOG":"Mary Davis/TRILOG"}) | Line Manager of Philip Collins/TRILOG<br>Line Manager of Mary Davis/TRILOG | The Notes formula is evaluated to a user list then the simple role is applied to each user independently. |
| {@UserName} | The workflow requester | Do not use @UserName in a formula, as the user who launched the FlowBuilder Router is returned. |
| Secretary({@Subset($UpdatedBy;-1)}) | The secretary of the user who last updated the document | Only valid if the Form is not marked anonymous. |
| Line Manager ({FB_Requester}) | The Line Manager of the Requester | This syntax is equivalent to Line Manager. |
| [Project] | The Project field in the document is interpreted as a role. Usually, users will use a dropdown list with the existing projects and have them available as roles in the Planner. If the user selects Project A for instance, MORSE will evaluate the role Project A to determine the recipients. | Square brackets can be used in the same way braces are used. MORSE would simply interpret the result of the formula as roles that yet need to be evaluated to recipients. |
| Secretary (Accounts Payable({FB_ActionUser})) | The secretary of Accounts Payable of all users who were acting on the document in the previous workflow segment. | Roles at any level may be composed. |

Routing Type

| | |
|---|---|
| Routing Type | Combined Approval/Edit |
| Notification Message | Default Approval Notification |
| Routing Category | Activity required |
| Activity Label | |
| Activity Description | You are required to Approve or Deny this request.<br>You are allowed to update the following information if needed. |
| Document Access | Editor |

Activity Status Labels

| | |
|---|---|
| Pending Status | Pending |
| Success Status | Approved |
| Failure Status (optional) | Denied |

Activity Result Notification

| | |
|---|---|
| Success Message | Successful Approval Message |
| Failure Message | Denial Message |

Routing Type

| | |
|---|---|
| Routing Type | Approval |
| Notification Message | Default Approval Notification |
| Routing Category | Activity required |
| Activity Label | |
| Activity Description | You are required to Approve or Reject the above request |
| Document Access | Read only |

Activity Status Labels

| | |
|---|---|
| Pending Status | Pending |
| Success Status | Approved |
| Failure Status (optional) | Rejected |

Activity Result Notification

| | |
|---|---|
| Success Message | Successful Approval Message |
| Failure Message | Denial Message |

Routing Type

| | |
|---|---|
| Routing Type | Review |
| Notification Message | Default Review Notification |
| Routing Category | Activity required |
| Activity Label | |
| Activity Description | Please acknowledge that you reviewed this document |
| Document Access | Editor |

Activity Status Labels

| | |
|---|---|
| Pending Status | Pending |
| Success Status | Reviewed OK |
| Failure Status (optional) | Back for changes |

Activity Result Notification

| | |
|---|---|
| Success Message | Successful Review Message |
| Failure Message | Denial Review Message |

Notification Message

Message Id: Default Approval Notification

Message description: This is the default message associated with all approval actions unless overriden in a workflow segment route description

Subject: {FB_Event} from {@Name([CN];FB_Requester)}: Approval Required

Body: Please approve the following document requested by {@Name([Abbreviate];FB_Requester)}:

Options:
- ☑ Append URL
- ☑ Keep URL Parameters
- ☑ Append DocLink

Building context sensitive messages:

In both Subject and Body, you can include the text of any Notes Formula adding or the routed document between braces. The FlowBuilder Route will evaluate all formulas at run-time. The following example uses FlowBuilder technical fields from the Workflow Subform.

Example:
{FB_Event} Approval Required
Request submitted by {@Name([CN];FB_Requester)} on {@Date(F_B_RequestTime)}

Figure 19b

Notification Message

Message Id: Default Review Notification

Message description: This is the default message associated with all review actions unless overridden in a workflow segment route description

Subject: [FB_Event]: Review requested by {@Name([CN];FB_Requester)}

Body: Please review the following document requested by {@Name([Abbreviate],FB_Requester)}:

Options:
- ☑ Append URL
- ☑ Keep URL Parameters
- ☑ Append DocLink

Building context sensitive messages:

In both Subject and Body, you can include the text of any Notes Formula acting on the routed document between braces. The FlowBuilder Router will evaluate all formulas at run time. The following example uses FlowBuilder technical fields from the Workflow Subform.

Example:
[FB_Event]: Approval Required
Request submitted by {@Name([CN];FB_Requester)} on {@Date(FB_RequestTime)}

Figure 19f

Notification Message

Message Id: Simple Review Completion

Message description: Simple Review Completion Message

Subject: [FB_Event]: Reviewer has reviewed the document.

Body: The document you submitted on [@Text(FB_RequestTime)] has been reviewed. See comments:

Options:
- [x] Append URL
- [x] Keep URL Parameters
- [x] Append Doclink

Building context sensitive messages

In both Subject and Body, you can include the text of any Notes Formula acting on the routed document between places. The FlowBuilder Router will evaluate all formulas at runtime. The following example uses FlowBuilder technical fields from the WorkFlow_Subform.

Example:
[FB_Event]:Approval Required
Request submitted by [@Name(CN);FB_Requester)] on [@Date(FB_RequestTime)]

Figure 19g

Notification Message

Message Id: Starnes Special

Message description:

Subject: This the special message for you

Body: You do not need to worry about this but it will cost you a lot of money

Options:
- [ ] Append URL
- [ ] Keep URL Parameters
- [ ] Append DocLink

Building context sensitive messages:

In both Subject and Body, you can include the text of any Notes Formula acting on the routed document between braces. The FlowBuilder Router will evaluate all formulas at run time. The following example uses FlowBuilder technical fields from the Workflow Subform.

Example:
{FB_Event}-Approval Required
Request submitted by: {@Name([CN];FB_Requester)} on {@Date(FB_RequestTime)}

Figure 25

WORKFLOW SYSTEM AND METHOD

CROSS REFERENCE TO RELATED APPLICATIONS

The present application claims the benefit of provisional patent application entitled "Automated Workflow System With Matrix Organization Search Engine" designated Ser. No. 60/194,932, filed Apr. 6, 2000, and provisional application designated Ser. No. 60/281,914, filed Apr. 5, 2001 and entitled "Workflow System Matrix Organization Search Engine" both are hereby incorporated by reference.

TECHNICAL FIELD

The present invention relates to the field of workflow software, and in particular to a network—enabled automated workflow system that utilizes a matrix organization search engine.

BACKGROUND OF THE INVENTION

Workflow is generally defined as a series of tasks within an organization to produce a final outcome. In particular, workflow, as defined by the Workflow Management Coalition®, is the automation of a business process, in whole or in part, during which documents, information, or tasks are passed from one participant to another for action, according to a set of procedural rules.

Workflow management system, as defined by the Workflow Management Coalition® is a system that defines, creates, and manages the execution of workflows through the use of software, running on one or more workflow engines, which is able to interpret the process definition, interact with workflow participants and, where required, invoke the use of information technology (IT) tools and applications.

Sophisticated workgroup computing applications allow defining different workflows for different types of jobs. So, for example, in a publishing setting, a document might be automatically routed from writer to editor to proofreader to production. At each stage in the workflow, one individual or group is responsible for a specific task. Once the task is complete, the workflow software ensures that the individuals responsible for the next task are notified and receive the data they need to execute their stage of the process. Some of the common workflow systems include Flowmark® and Powerflow®.

IBM Flowmark® is a workflow management system that helps organizations to define, document, test, control, execute, and improve their business processes. Furthermore, it helps define control flow and data flow via a graphical interface, thereby avoiding writing of code. Flowmark is usually used in conjunction with Lotus Notes®.

Percussion Powerflow® is a tool for adding workflow logic to any Domino® application via a graphical interface. Powerflow also performs statistical analysis on business processes. Powerflow requires a Domino server (4.5 or above).

One of the shortcomings associated with prior art, such as IBM Flowmark and Percussion Powerflow, is the failure to provide for a simple graphical user interface for the creation of a workflow process and the failure to subsequently track and analyze the workflow process in real time. Furthermore, none of the prior art mentioned above describes a method for remote workflow management. This is a major disadvantage in today's world where network based business transactions are abound. Thus, organizations that are integrated with such prior art systems are dependent on third party systems and software to maintain a smooth workflow.

Therefore, there is a need for a workflow management system that is integrated with an easy simple-to-use graphical user interface for creating workflow processes. Furthermore, there is a need for a system that provides for network-enabled workflow management in real time.

Additionally, what is needed is a tool that allows businesses to build and maintain web enabled workflow solutions to support electronic business applications, as well as business-to-business relationships. Furthermore, it is beneficial to have an enterprise workflow tool that provides, for the first time, a clear separation between the application, the processes and the organization. The present invention provides for a well implemented, maintained and administered network-enabled workflow model that maximizes user group control, and can dynamically adapt to changes in the enterprise.

Whatever the precise merits, features and advantages of the above cited prior art systems, none of them achieve or fulfills the purposes of the present invention.

SUMMARY OF THE INVENTION

The present invention provides for a network enabled workflow system that allows businesses to build and maintain web enabled workflow solutions to support electronic business applications, as well as business-to-business relationships. Additionally, the workflow system provides real time analysis of workflow processes. Furthermore, the enterprise workflow system of the present invention provides a clear separation between the application, the processes and the organization. The workflow tool is implemented via a simple, easy-to-use graphical interface.

The network-enabled workflow system of the present is further integrated with a matrix organization search engine that interfaces with an organizational database to service routing requests from users/clients.

Thus, the network-enabled workflow system present invention also allows workflow services to be rendered to external organizations such as partners, suppliers, distributors and customers. Workflow services are preferably represented by roles that can be used to represent workflow actors in the workflow routing rules. These roles are preferably evaluated at run-time to best match recipients (via the MORSE algorithm) depending on the organization context from which the routing request is made.

These and other objects, features and advantages of the present invention will become apparent in light of the following detailed description of preferred embodiments thereof, as illustrated in the accompanying drawings.

BRIEF DESCRIPTION OF THE DRAWINGS

FIG. 16 illustrates a table describing role evaluation with composed roles;

FIGS. 18a–e collectively illustrate various routing types generated by the visual designer of the present invention;

FIGS. 19a–i collectively illustrate the various notification messages generated by the visual designer of the present invention;

FIG. 25 illustrates a screenshot for setting the frequency and priority of work flow processes.

DETAILED DESCRIPTION OF THE INVENTION

Figure 1:
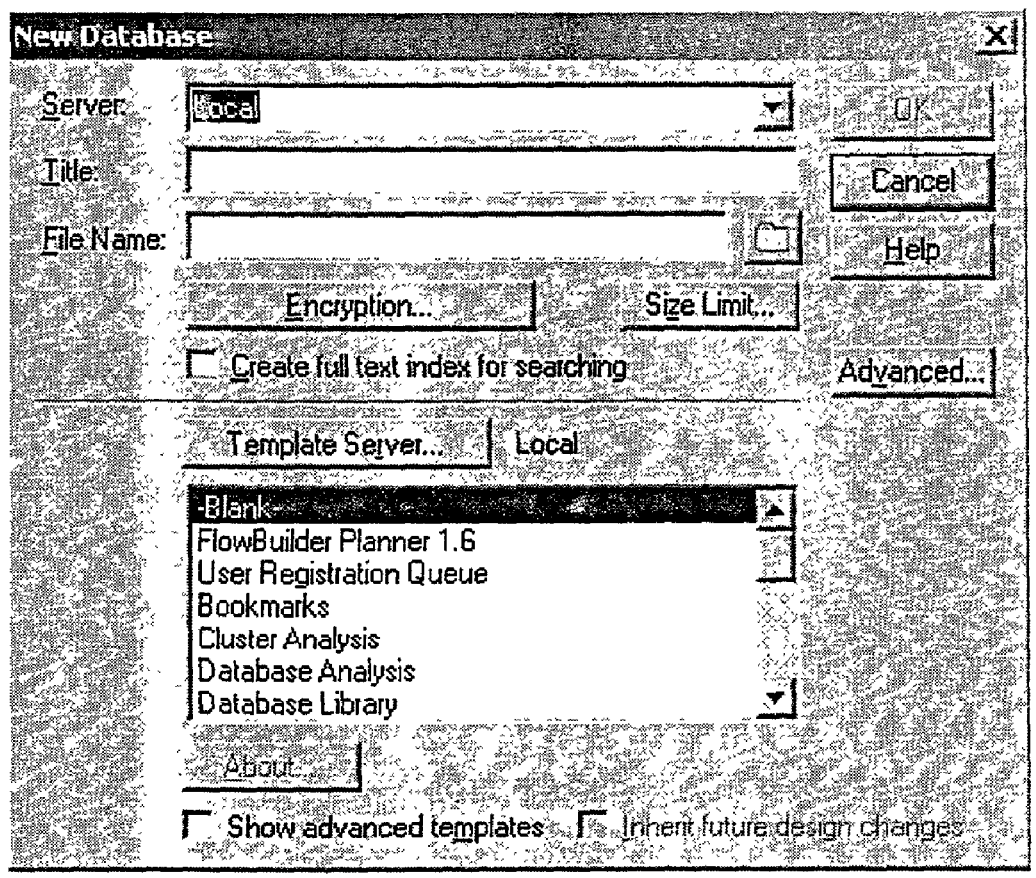
FIG. 1 illustrates a screenshot for creating a new database.

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as an exemplification of the principles of the invention and is not intended to limit the invention to the embodiment illustrated. Those skilled in the art will envision many other possible variations within the scope of the present invention.

The co-pending application, entitled "Matrix Organization Search Engine (MORSE)", fully describes an automated workflow system that includes a matrix organization search engine that interfaces with an organizational database to service routing requests from users/clients. The matrix organization search engine is a rules based system that provides workflow routing in response to a client request via the Flowbuilder module. The search engine employs search techniques adapted for use with multi-dimensional tree structures that define the organizational model. The matrix organizational model is multidimensional with axes comprising an organizational unit, a title hierarchy, and functional roles. This multidimensional structure combined with an intelligent search engine provide for an automated workflow system.

The present invention provides for a simple easy-to-use network-enabled workflow management system that provides for web-enabled workflow solutions and helps monitor workflow processes in real time. Furthermore, a clear separation between the application, the processes and the organization is accomplished via the workflow tool of the present invention. Thus, the present invention provides for an easily implemented, developed, maintained and administered network-enabled workflow model that maximizes user group control, and can dynamically adapt to changes in the enterprise environment.

The network-enabled workflow model of the present invention is further integrated with the Matrix Organization Search Engine (MORSE) algorithm to help define resource routing rules in the workflow model. The implementation of the present invention's network-enabled workflow model is accomplished via a visual designer.

The visual designer allows users/clients to create complex workflow cycles by simple drag and drop operations. All objects are created and manipulated visually using toolbars. Furthermore, the visual designer saves workflow objects in a flowbuilder administration database. The visual designer further allows user/clients to custom create routing types (beyond just approvals and reviews) and assign custom notification messages.

It should be noted that the flowbuilder and the visual designer may be used by a Notes® power user and does not require any specific skills beyond eventually writing simple Notes formulas for conditions. The visual designer further provides for a simple interface for developing complex execution and branching conditions based on document fields and fields in the document itself.

Described below is an overview of the visual designer interface as a network-enabled workflow management tool. It should be noted that the visual designer interface of the present invention is integrated with the matrix organizational search engine algorithm.

Using Flowbuilder Objects to Build Workflow Capable Applications

The flowbuilder objects wizard allows users to enhance their existing Notes databases with added function that will integrate to the workflow engine. Adding the flowbuilder objects components provides the user interface and the workflow context fields necessary to create the present invention's web-based workflow application.

Described below are the stages involved in the procedure of adding workflow components to a Notes application:

1. creating a new workflow-enabled Notes® application;
2. inserting the flowbuilder sub-forms; and
3. adding flowbuilder components to an existing Notes application and handling design conflict workarounds for existing applications Before proceeding with a description of the stages described above, it is assumed that one skilled in the art is familiar with the programming and functionality associated with the Domino designer® and Domino server®. Furthermore, it should be noted that although the server and designer used to illustrate the visual designer of the present invention are the Domino server and Domino Designer respectively, a person skilled in the art of workflow programming can implement the present invention in any similar or equivalent server or designer.

1) Creating a New Workflow Application with Flowbuilder Objects

Figure 2:
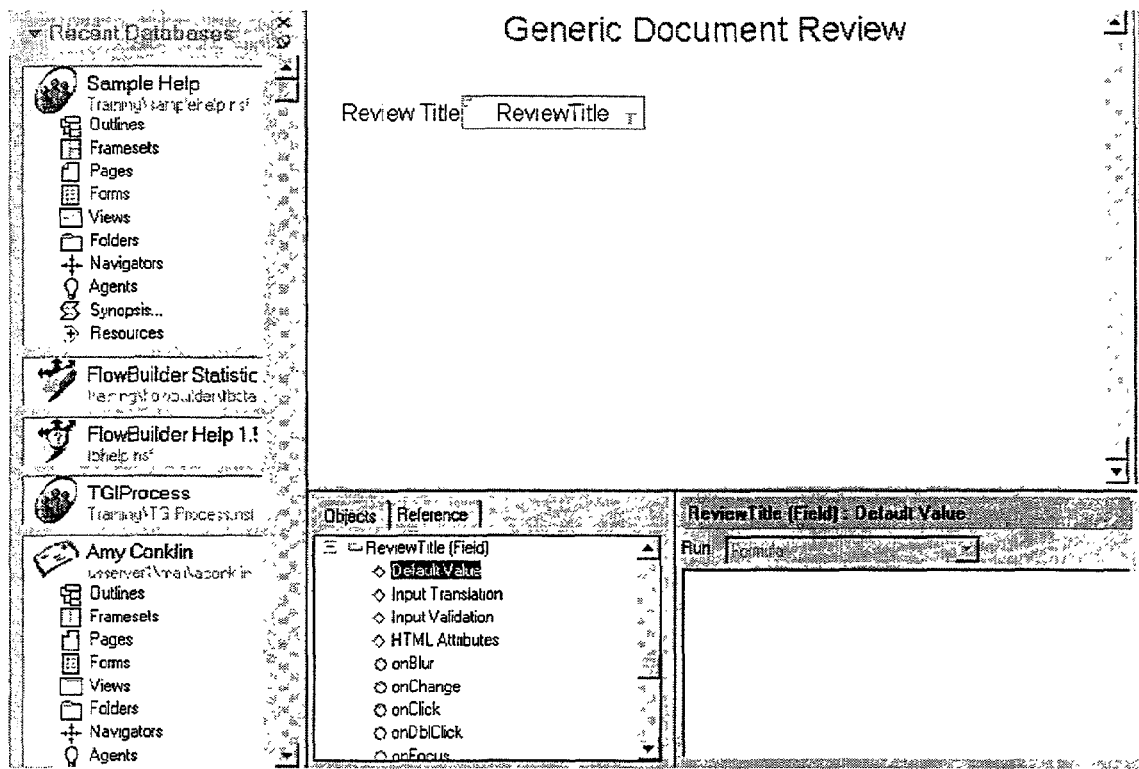
FIG. 2 illustrates the Domino designer window.

As a first step, users create a new database from the Notes workspace using the menu function <File|Database|New>, and specify the name and location of the new database they desire to create in the dialog box, such as that shown in FIG. 1. Once the database is created, users open it using a visual designer. Next, users create a new form by adding fields, properties and formulas. Therefore, from the main menu (not shown), users choose <Create|Design|Form> and the Domino Designer window appears as in FIG. 2. To add fields to forms, users click on <Create|Field> from the main menu (not shown). Furthermore, in the field properties window, users are able to specify the name of the field, and other properties associated with its design/content.

Users add flowbuilder components to their database by opening the "flowbuilder objects wizard" (fbobj16.nsf) in the Notes workspace. The objects wizard window opens and users are able to specify the server and database name of the form they created. Next, clicking on the button, "Add Objects", at the top left of the screen adds the required design elements to the users new database thereby implementing workflow automation.

2) Adding the Flowbuilder Subforms to a Notes Form

Users open the database in the designer and add the flowbuilder subforms to the top and bottom of their newly designed form. It should be noted that although these subforms are largely invisible to the workflow participant, they are essential to workflow-enable forms.

Furthermore, users are able to position the cursor at the top of the form (positioning at top of form is not required, subforms may be inserted at any point) and from the main menu (not shown), they choose -<Create|Insert Subform> and click on the "Flowbuilder generic subform" in the selection box. Users are able to repeat the same sequence by positioning the cursor at the bottom of the form (or and selecting wherever they like the "Submit" and "Save as draft" buttons to appear) and selecting the "Flowbuilder generic footer" from the selection box to provide for a workflow-enabled form. It should further be noted that in a further implementation, the requester has the ability to save work as "draft", without initiating workflow.

3) Adding Flowbuilder Components to an Existing Notes Application and Handling Design Conflicts Before inserting the Flowbuilder subforms, the forms must meet some basic requirements that will prevent duplications and resulting conflicts in design. A few of these requirements are described below:

1. If the "SaveOptions" of the "$$Return" in the form are already in use, users need to either remove these fields (as they are managed in the Flowbuilder Generic Subform), or set the field values externally using formulas. An example of setting the fields externally is given below:
   (i) Copy the "$$Return" and "SaveOptions" fields into two new fields named "Return1" or "SaveOptions1", and set these fields to be computed for display.
   (ii) Go to the Value Formula for each field and assign the resulting value to a variable named result or some other name.
   (iii) At the end of the formula, add the following statement:
   @If@IsDocBeingSaved & SaveOptions="1";@SetField("$$Return";result);" ") in the Return1 value and @If@IsDocBeingSaved;@SetField("SaveOptions";result);" ") in the SaveOptions1 value.

2. Remove any workflow design and script built-in to the existing form, as it may conflict with the Flowbuilder workflow execution.

3. Remove the submit button and insert the "Flowbuilder Generic Submit Button" or copy the "Hide Paragraph When" formula from the Flowbuilder Generic Submit Button and assign it to the submit button.

Designing Workflow Processes

The Flowbuilder Administration database is the centralized store for all workflow rules. Workflow events are stored as documents in the "Administration database". Users are able to create and administer multiple administration databases to serve their organization.

The browser-based Visual designer allows users to create complex workflow cycles with simple drag-and-drop operations. A major advantage of the Visual designer is that users are not required to have programming knowledge to design workflow processes. Therefore, workflow events are created and manipulated visually, using toolbars, and are assigned custom routing types or notification messages.

To help better understand the design aspect of the present invention's network enabled workflow, the design process is broken (and described in detail) into the following topics:
1. overview of the Flowbuilder Visual designer;
2. defining workflow events;
3. building workflow cycles; and
4. custom routing types and notification messages and managing deadlines in the workflow process 1. Overview of the Flowbuilder Visual Designer It should once again be noted that although the server and designer used to illustrate the visual designer of the present invention are the Domino server and Domino Designer respectively, a person skilled in the art of workflow programming can implement the present invention in any similar or equivalent server or designer.

Figure 3:
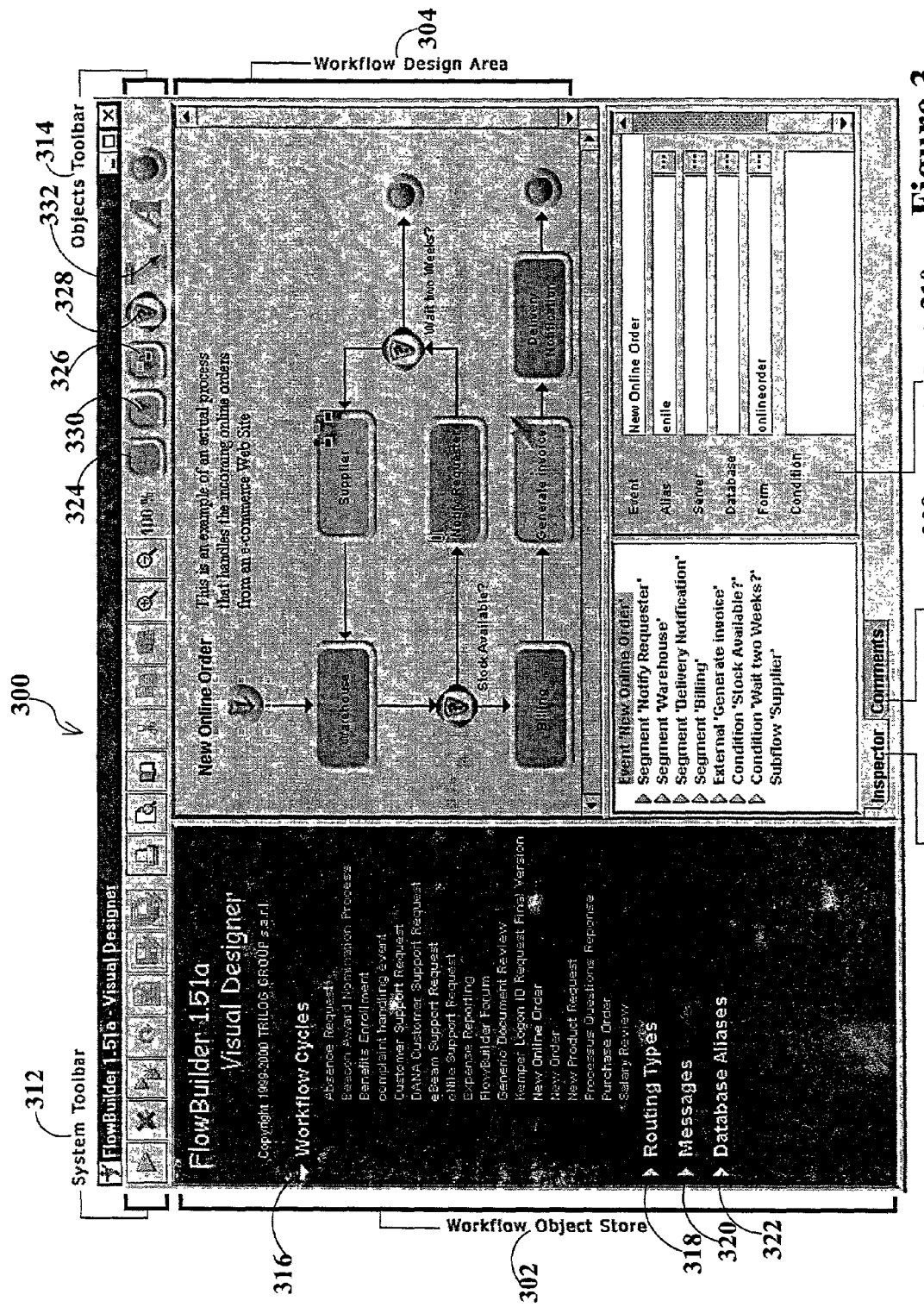
FIG. 3 illustrates a visual designer graphical user interface and its associated component areas.

This section describes the visual designer, its design elements, and the general functionality of each area in the visual designer window. FIG. 3 illustrates visual designer window 300 and its component areas.

Object Store 302: Define and store workflow cycles, routing types, messages and database aliases.

Design Area 304: View and create workflow cycles using the objects toolbar.

Object Inspector 306: Update the workflow object properties.

Comments Panel 308: Attach text to workflow cycle objects. Once the comments are added, the attachment icon is shown in the right top corner of the object to indicate that the object has comments associated with it.

System Toolbar 312: Edit, validate, print and view workflow cycles.

Object Toolbar 314: Drag-and-drop visual objects to create and define workflow cycles.

Workflow objects in the visual designer are fully customizable to meet individual business process requirements. Given below is an overview of the object containers and their functionality.

Workflow Cycles 316: A workflow cycle is a structured collaboration model that describes how different components should interact in order to complete a certain business process. Generally, a business process defines a set of specialized services to be performed in response to a business event, which can be either internal or external.

Workflow Cycles includes of events and conditions. Each workflow cycle will be represented graphically in the workflow design area, and the events and condition details will be described in the workflow object inspector.

This object container is used to manage all the workflow cycles related to a particular administration database. Users click on the cycle name to view and edit the workflow.

Routing types 318: A routing type defines a generic action model for workflow handling. Approvals, reviews and notifications are examples of standard routing types. It should be noted that routing types are fully customizable to fit individual business process requirements.

A routing type can be either informational, where document routing is simply notification to the recipients, or may require user intervention, so that the user must perform an action on the document before a workflow cycle resumes. Routing types involving user action are based on a 2-state (pending, done) or a 3-state (pending, success, failure) action model.

In addition, routing types are usually associated with notification messages involving either a 2-state or 3-state action model. The main notification message is the one that is sent to the recipients participating in the workflow cycle. The success and failure messages are notified to the requester upon completion of a workflow step, depending on the global result.

Messages 320: A notification message includes of a message ID, a subject and a body. Both subject and body allow for incorporating Notes formulas and are evaluated at run-time against the routed document and sent to defined recipients.

Database Aliases 322: Database aliases are useful in defining workflow cycles that are independent from the physical names associated with the server and database. Furthermore, using database aliases is advantageous in minimizing maintenance efforts.

This approach will allow users to change the server and database name, as needed, so that it will be reflected in every workflow cycle pointing to the original database.

Furthermore, the visual designer objects are the building blocks of workflow cycles. Using simple drag-and-drop operations, users are able to create complex workflow cycles in the visual designer. Described below are the visual designer objects and their use in a workflow cycle.

Event: An event is a representation of an incoming action that trigger a workflow cycle. The event name is a unique identifier of a workflow cycle. Additionally, several forms in a database are able to trigger the same event, thereby allowing for a convenient way of sharing workflow cycles.

Segment 324: Workflow segments are the building blocks of a workflow cycle. Each segment represents one workflow step, and is fully defined by the event name, the source segment and the target segment. Furthermore, a segment defines the routing rules for the document that triggered the event.

It should however be noted that, each segment is able to route documents according to only one routing type. Therefore, if two separate routing types are required, then two segments needs to be defined.

Additionally, segments having the same source segment are executed in parallel as two different copies of the document (split process). When a split process occurs, document copies appear in the tracking view as responses to their parent document. This allows the requester to keep track of the entire workflow cycle.

Sub-flow 326: One of the many advantages of the present invention's network enabled workflow system is the ability to create and define workflow cycles and their subsequent use as a subflow in multiple business processes. Moreover, reusing common business processes ensures uniformity of processing and reduces maintenance effort associated with process improvement.

Condition 328: Conditions allow for more complex workflow cycles by handling multiple execution paths in a single workflow cycle. A condition is specified in one of three ways: by the result of previous workflow action (i.e., success, failure, percentage of success or failure), by the value of a Notes formula on the routed document (must evaluate to either @True or @False), or by the organization or role of the requester.

External Process 330: The external process object is a generic workflow object that allows clients to call a Domino agent within a workflow cycle. External processing may be used to exchange data with external data sources such as ERP systems, relational databases using an ODBC connection, etc. In an extended implementation of the present invention, a Flowbuilder API script library is provided to help query the routed document(s) and commit updates on the routed document if necessary. All agents called use this script library to integrate with the Flowbuilder router environment.

Link 332: The link object shows directional flow through the object set (to include segments, conditions, external processing and sub-flows). Links are made by dragging the link object to the source object, moving the mouse over the target object, and clicking on the left mouse button to connect. Links can be resized or reshaped, as desired.

In the workflow design area, users create a workflow cycle using the objects toolbar. With simple drag-and-drop operations, users place and move objects in the design area. The Flowbuilder visual designer includes a standard set of workflow cycles for reference and testing purposes. Users are able to alter these workflow cycles to fit their business process requirements or, on the other hand, they are given the option of customization that provides for the creation of new workflow cycles using the visual objects.

The steps for creating a workflow cycle in the visual designer are outlined below:
Define the workflow event
Build the workflow cycle using objects from the objects toolbar
Define workflow objects in the object inspector
Add custom routing and notification messages
Validate a workflow cycle in the visual designer A workflow start object automatically appears in the design area and the start of workflow processing is triggered by an event, represented by the start object. Users are able to specify the event trigger condition in the corresponding properties panel.

Furthermore, users are able to add objects to the cycle, simply by dragging-and-dropping objects from the objects toolbar. Additionally, to link two objects together in a workflow path, users drag the link object to the source object, then place the mouse over the target object and click the left mouse button.

It should be noted that if users run out of space in the design area because a business process is complicated and contains a large number of events and conditions, they are able to use the zoom buttons to navigate or maximize the design area to view the entire cycle. Furthermore, the edit tools allow users to cut, copy and paste objects in the design area.

To view existing workflow cycles, users click on the yellow container arrows in the object store panel (left). The workflow process will appear in the design area, and the corresponding workflow definitions/rules will be shown in the object inspector. On the other hand, to delete a workflow cycle, users select either from the design area or the object inspector and click the delete button from the system toolbar.

2) Defining a Workflow Event

The first step in designing any workflow cycle is to define the workflow event (i.e., the action triggering the workflow processing). An event, in the context of this patent application, is defined based on the following criteria:

1. An event name, which must be unique in the workflow cycle event list.
2. The server and database in which a form will be submitted. Additionally, users are able to specify a database alias, instead of hard-coding the server and database name.
3. The form(s) that, when submitted, would trigger this event. In Flowbuilder, events are detected (and are available from the pick list) only if the Flowbuilder Subforms have been added. If no form is specified, all documents in the database that have been submitted through a 'flowbuilderized' form (form created via flowbuilder) will generate the event.
4. A condition on the document field values after the document has been submitted. If no condition is specified, the condition is always assumed as "true". An 'event condition' can be found in the event property panel and is useful in determining whether a document is subject to the workflow process. If the condition returns a false statement, no event will be triggered.

Figure 4:
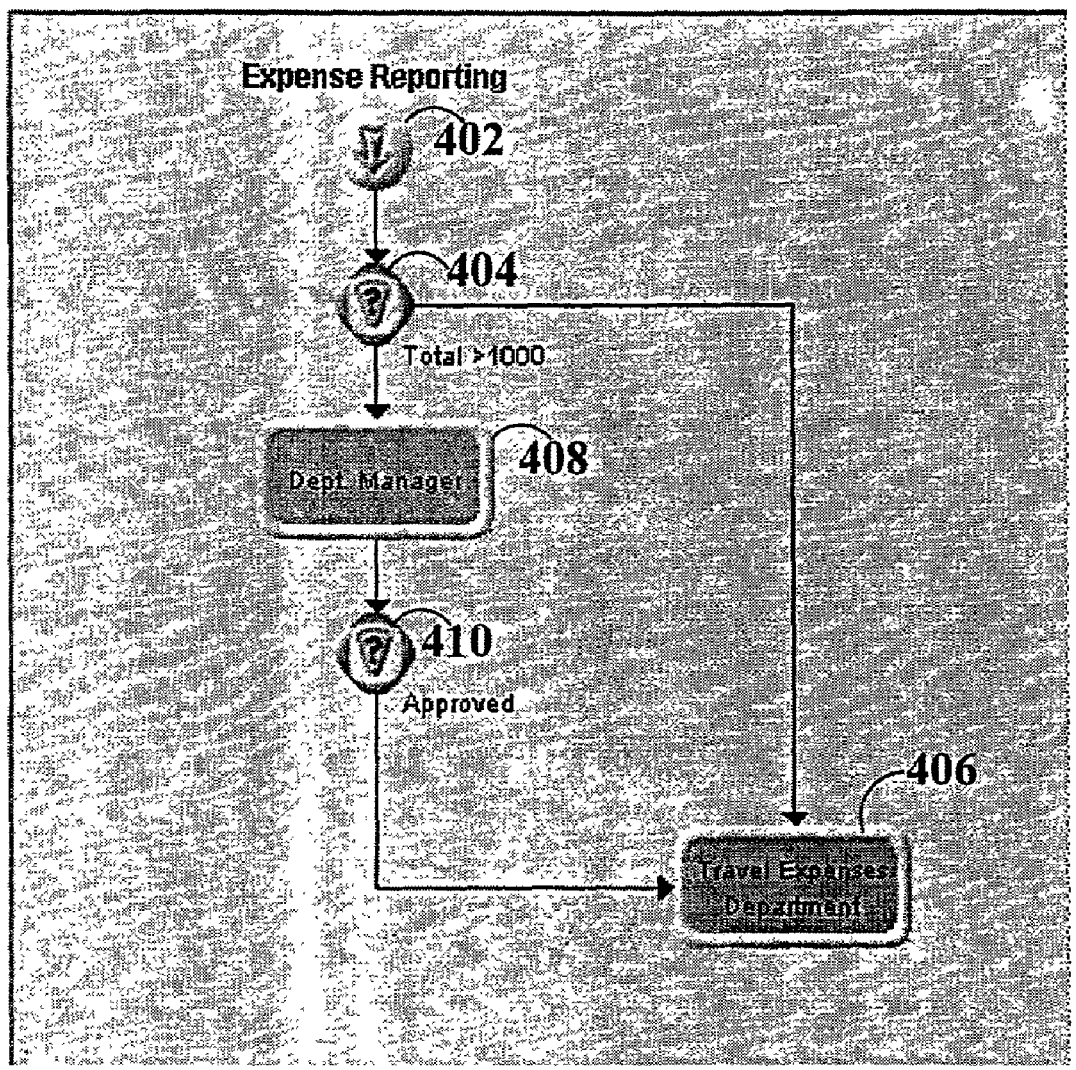
FIG. 4 illustrates an example of a workflow process designed with the present invention's visual designer.

An example of a workflow created with the present invention's visual designer is shown in FIG. 4. In the expense reporting example, workflow is triggered (402) and a check (404) is performed to see if the expense is greater than 1000. In the instance expense is greater than 1000, the travel expense department (406) is notified. On the other hand, if the expense is less than 1000, then the department manager (408) is notified and the travel expense department is contacted pending the department manager's (408) approval (410).

Figure 5:
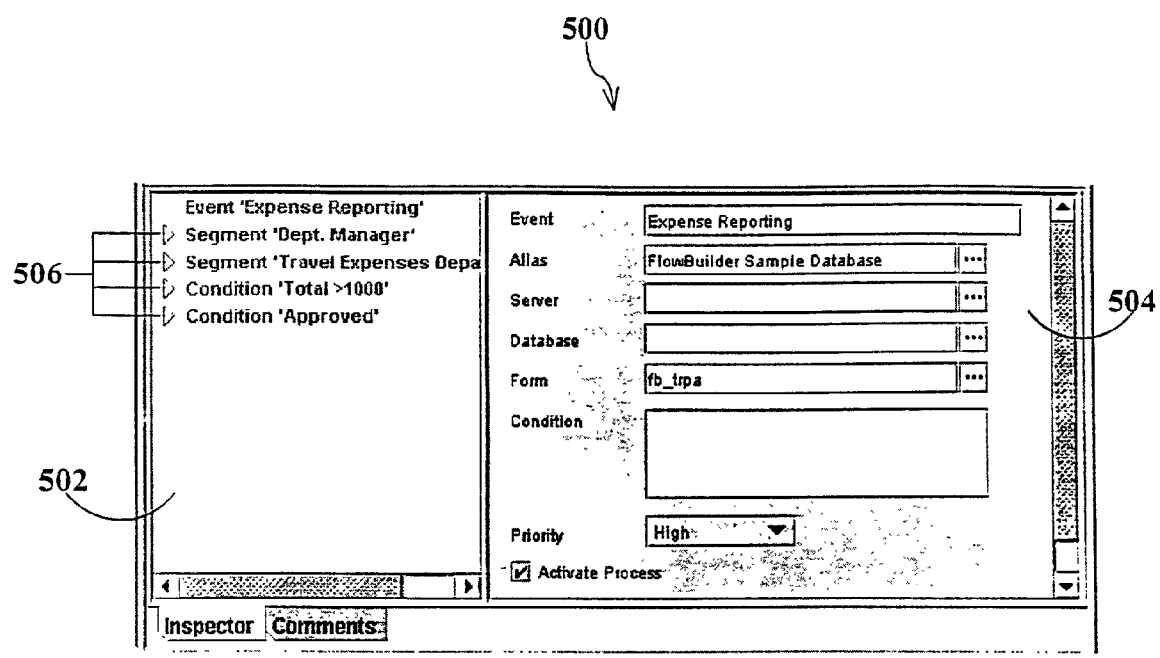
FIG. 5 illustrates an object inspector panel for setting workflow object properties.

FIG. 5 illustrates an object inspector 500 panel wherein users set the workflow object properties. Each object that is placed in a workflow cycle has an entry in the object inspector. Before validating a workflow cycle, the required field in the object inspector needs to be defined. Additionally, the object inspector has two sub-panels:

The Object List Panel 502: An expandable list that contains the names of all objects in the selected workflow cycle. Whenever an object is dragged from the objects tool to the design area, an entry will be added automatically to this list. To expand each item of the list, users click on the appropriate arrow (506) next to the item.

Property Panel 504: Depending on the selected object or selected fields, the appropriate property panel is presented for input. The property panel is used to edit properties of the current workflow object, such as specifying an event trigger, condition formula or routing rules for a workflow segment. There are different field property requirements depending on the type of workflow object being defined.

A workflow segment is the minimum criteria for workflow routing. It is not necessary to incorporate each workflow object type into a workflow cycle, but there must be at least one segment object. A segment is analogous to a "step" in the workflow process. As given below, each workflow segment has five sub-categories that define how it processes workflow:

1. routing type;
2. routing rules;
3. routing options;
4. deadline date; and
5. deadline handler.

1. Routing Types, Notification Messages, and Managing Deadlines in a Workflow Process.

Routing Type

Figure 6A:
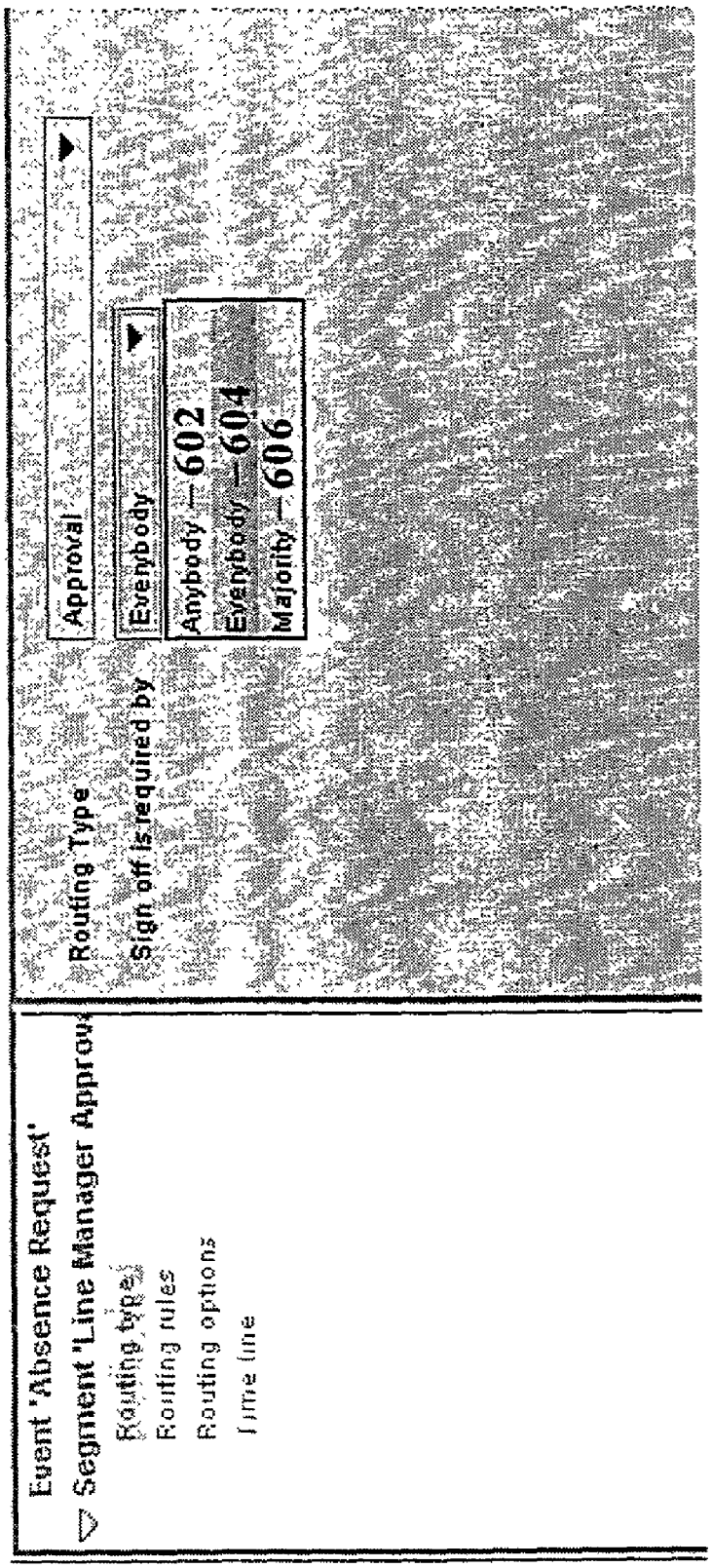
FIGS. 6a–b collectively illustrate various approval and routing types.
Figure 6B:
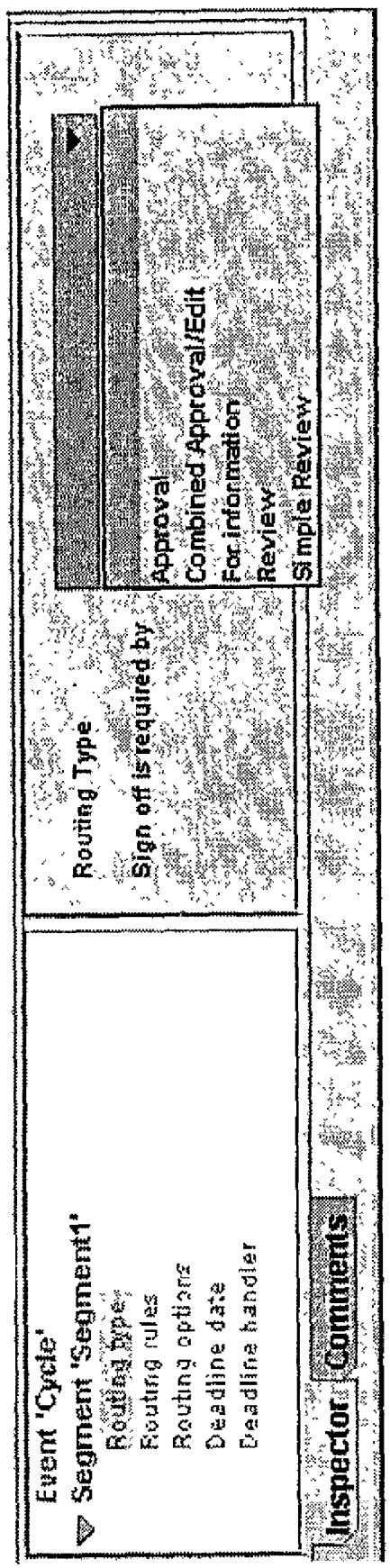

Users choose a routing type from the pick-list, and success is measured (i.e., "sign-off is required by") depending upon the attributes of the routing type. As FIG. 6a illustrates, approval may be required by "anybody" 602, "everybody" 604 or the "majority of recipients" 606. For example, in the case of a single approver, either "anybody" or "everybody" may be defined. Additionally, users are able to define the sign-off policy by choosing an option from the drop list. To use the "majority" option, users define the percentage of recipients who must act favorably on the event. FIG. 6b illustrates a screenshot of examples of various routing types.

Routing Rules

Figure 7A:
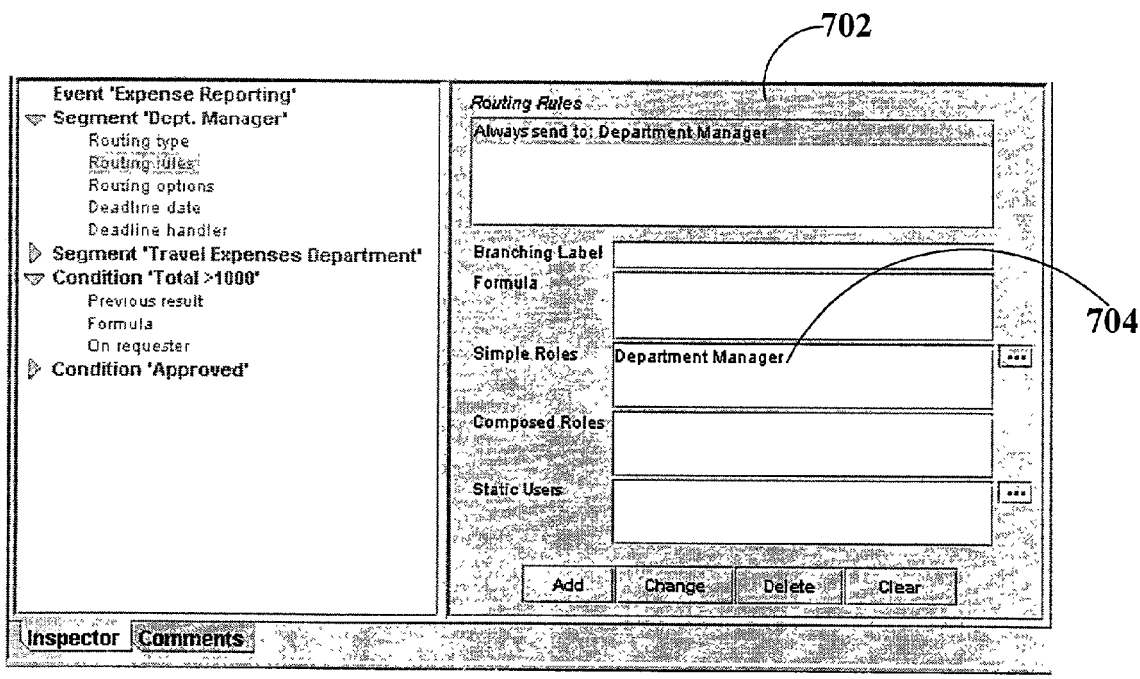
FIGS. 7a–b collectively illustrate the routing rules panel.

FIG. 7a illustrates a screenshot of the routing rules panel. In the routing rules panel 702, users define the target recipients for a segment by specifying recipients through simple roles (such as 'Department Manager' 704), composed roles (such as 'Line Manager(Line Manager(Payroll)) '), or even through static users. It should be noted that defining static users is not recommended as hard-coded recipient relationships are not supported through MORSE and will require manual maintenance efforts.

Figure 7B:
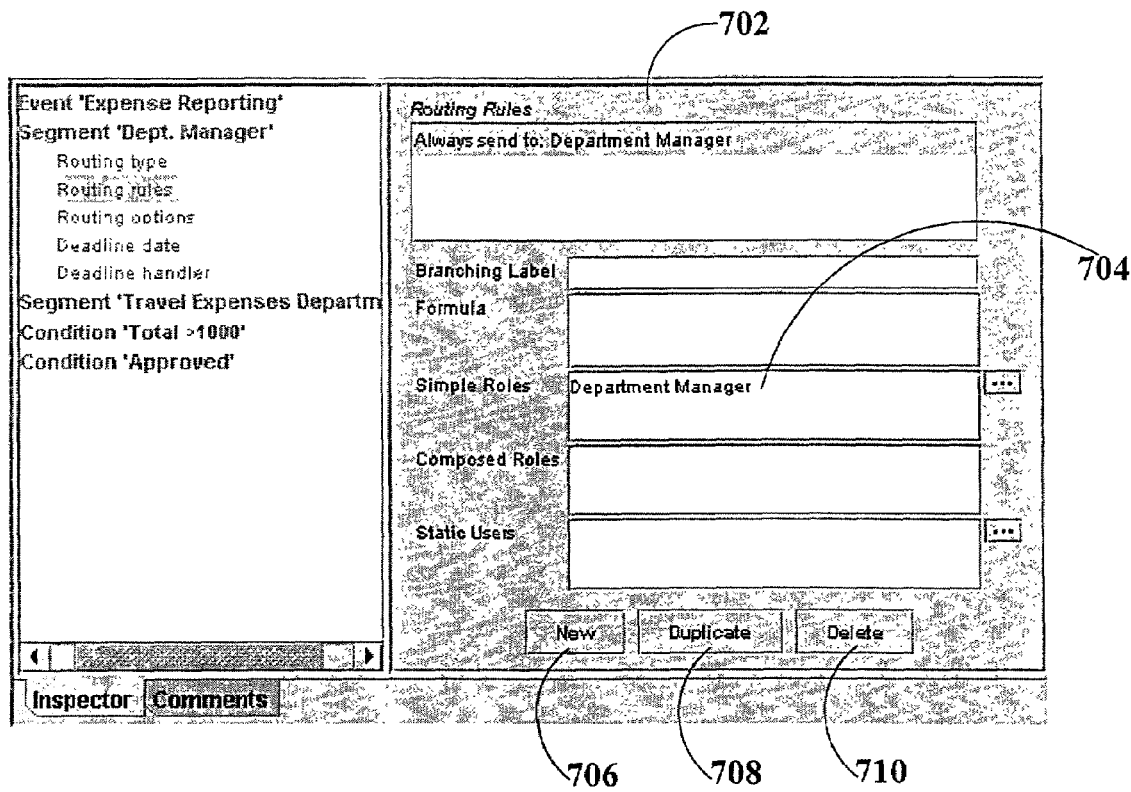

FIG. 7b illustrates a screenshot of the routing rules panel after a user has specified a recipient. To define routing rules in the object inspector, users select an available role from the simple roles pick-list. Upon selection, the "Routing Rules" field will automatically populate. To add additional roles, users click on the "New" button 706 at the bottom of the panel and repeat selection from the pick-list. The role they choose will be added in addition to the previous role selection. To delete a routing rule, users select the corresponding line from the "Routing Rules" box and click on the "delete" button 710 at the bottom of the panel. Users are able to also duplicate an existing rule by clicking on the "duplicate" button 708. Once again, it should be noted that each segment is able to route documents according to only one routing type. If two separate routing types are required, then two segments must be defined. Furthermore, to prevent workflow cycle "looping", each segment in a workflow should be named with a unique identifier.

Routing Options

Figure 8:
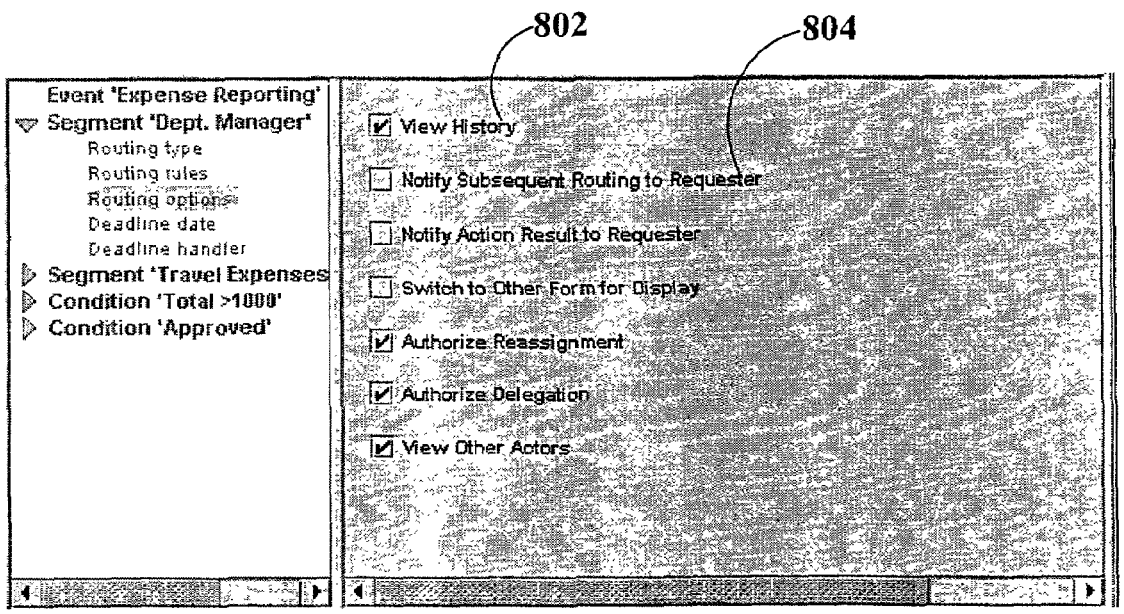
FIG. 8 illustrates a screenshot of routing options.

A screen shot of routing options of the Visual Builder is shown in FIG. 8. Routing options allow users to control the options a requester or recipient will have in acting on a workflow process. Users can also control the type of information available to workflow participants ('view history' 802, 'notify subsequent routing to requester' 804, etc.).

Defining External Processing Segments

An external processing segment is a generic workflow object that allows users to call a Domino agent inside a workflow cycle. For example, data can be incorporated from an external system to another system such as an HR database (using an ODBC connection).

Figure 9:
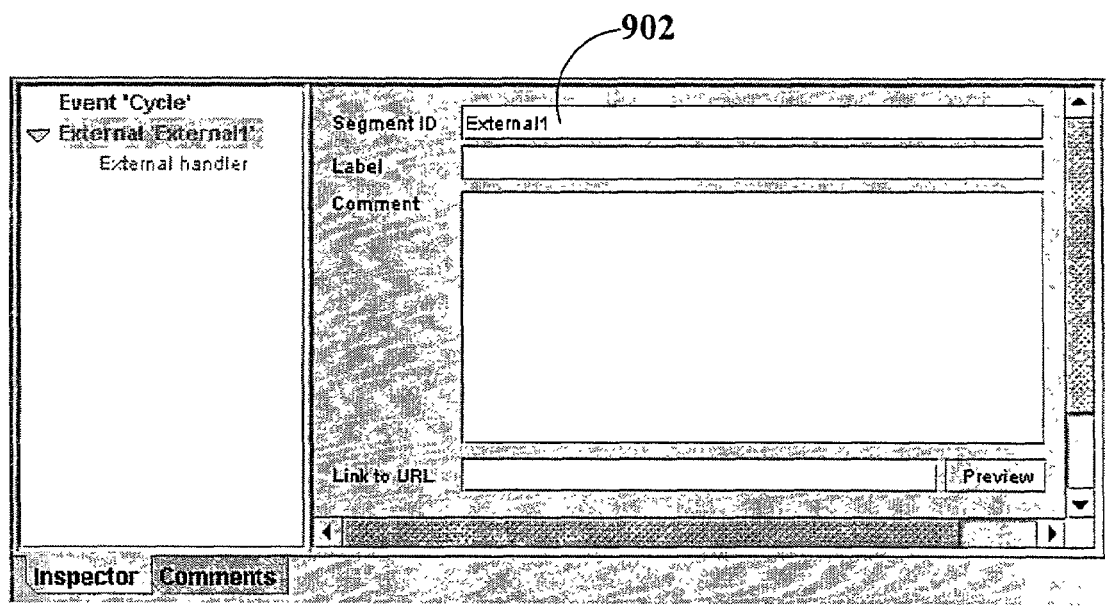
FIG. 9 illustrates the object inspector panel with an external processing segment.

To add an external processing segment to a workflow cycle, users drag the external processing object from the tool bar to the desired location in the design area. FIG. 9 illustrates a screenshot of the object inspector with an external processing segment. Furthermore, a unique segment ID 902 must be assigned to the workflow cycle to prevent process "looping".

Figure 10:
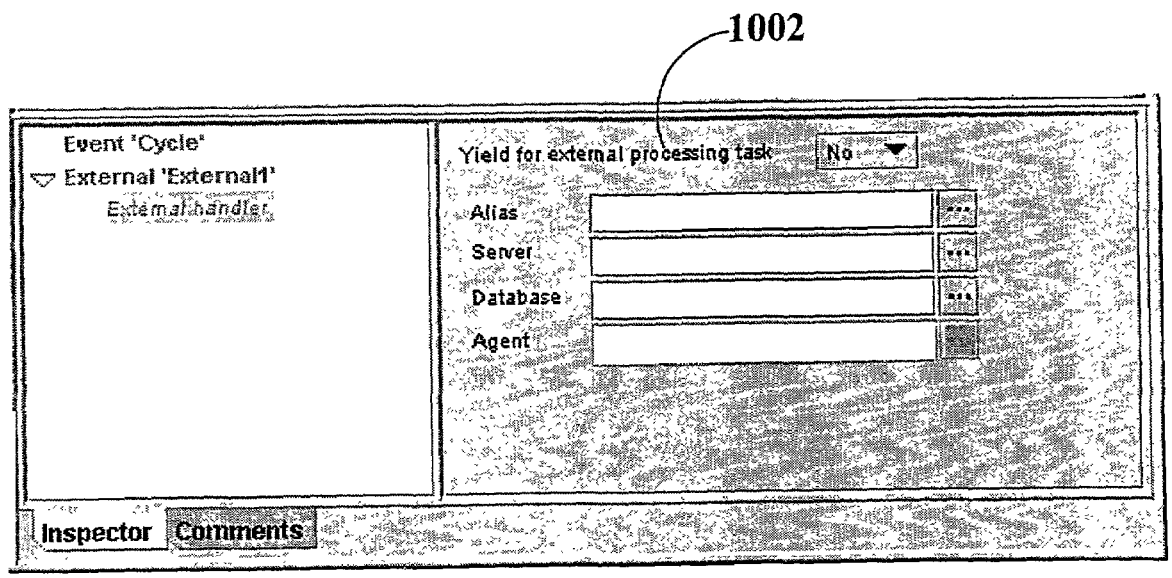
FIG. 10 illustrates a screenshot for activating the external process.

Users define the database and the agent the external process will execute. They are able to either enter a database alias (and choose an agent) or enter the server name, the database name and the agent. As show in FIG. 10, to activate the external process users choose "yes" in the "Yield for external processing task" field 1002.

4. Managing Deadlines in the Workflow Process Deadline Date

Setting a deadline date allows users to control workflow processing times for each routing step. A deadline is defined in one of two ways:
1. With a handling margin (i.e., the number of days that the workflow will allow a document to stay in the system, unprocessed) that is relative to the date the workflow actor received the request. The handling margin can be specified in days, hours or minutes.
2. With a user defined field or formula that results in a date. For example, if an application form contains an input field for "deadline date", users are able to set the deadline type to "user defined deadline date". The flowbuilder router would then manage the deadline based on the value of the defined field.

Figure 11:
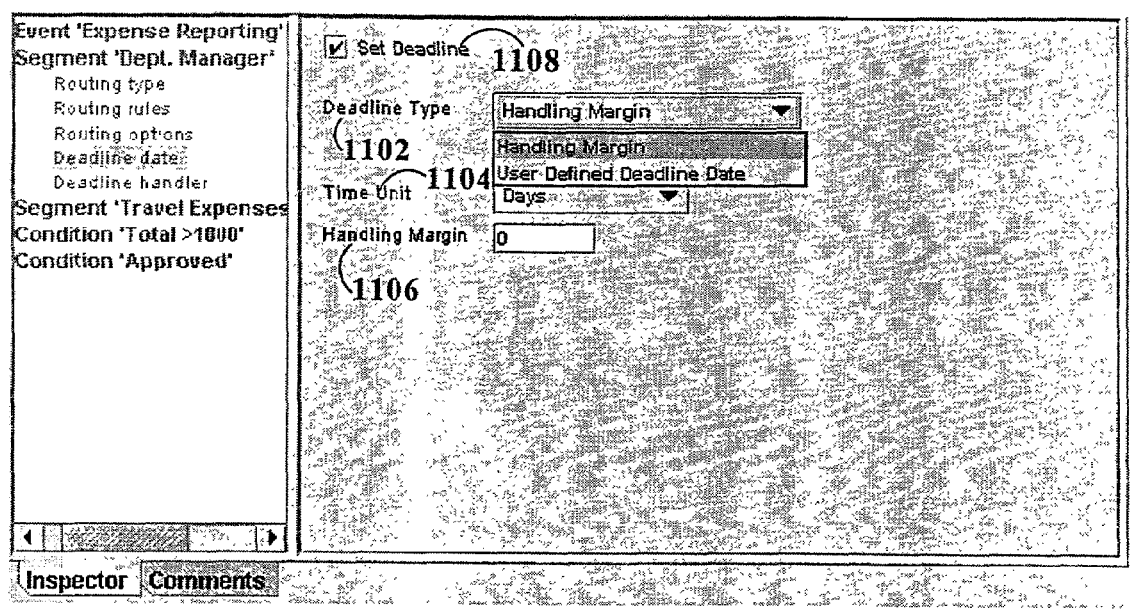
FIG. 11 illustrates a deadline date panel in the object inspector.

FIG. 11 shows the deadline date panel in the object inspector. Setting options for deadline type 1102, time unit 1104 and handling margin 1106 is available by selecting the "set deadline" box 1108.

Deadline Handler

Figure 12:
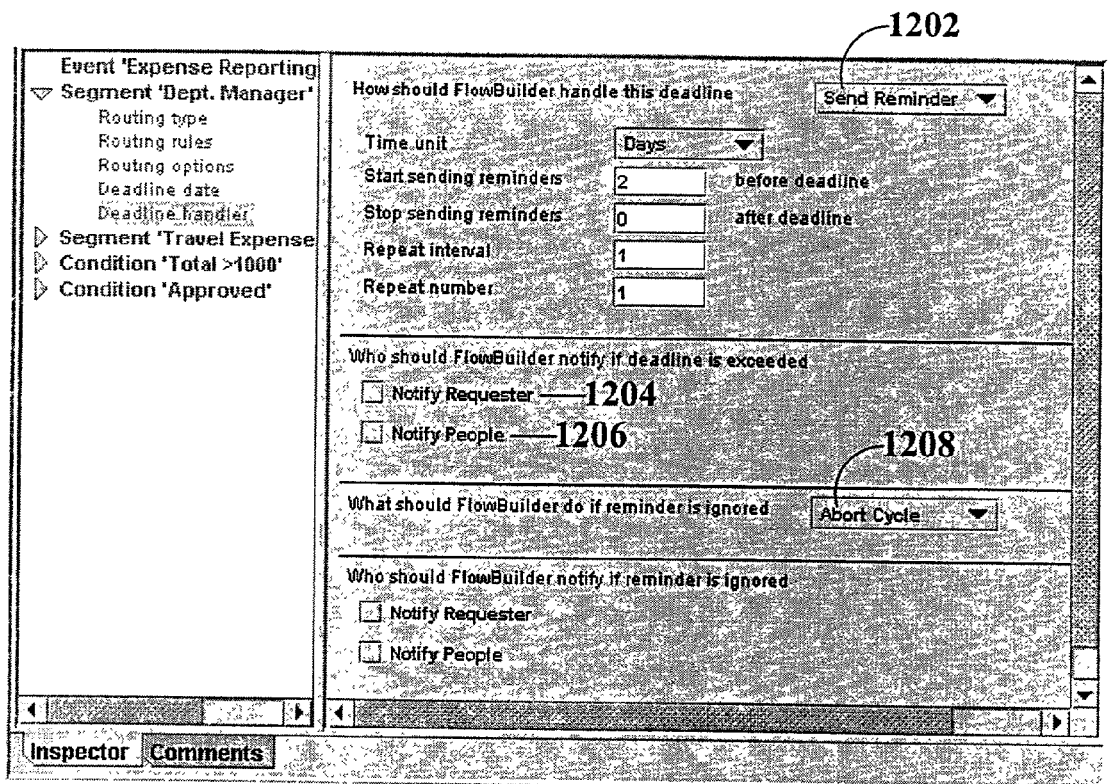
FIG. 12 illustrates the deadline handler panel in the object inspector.

FIG. 12 illustrates the deadline handler panel in the object inspector. Once the deadline date options is set, deadline management in the deadline handler can further be automated. After a deadline is set, actions are managed automatically based on the options selected. There are six options in deadline handling as described below.

"Send reminder" 1202 reminds the recipient to take action on the workflow process. Time may be specified in days, hours, and minutes. Users are able to also specify the number of reminders and the repeat interval. If no action is taken after all reminders have been sent, reminders are considered ignored and further actions are available in the ignored reminders section.

"Notify requester" 1204 sends an e-mail notification to the requester when deadline is exceeded or reminders are ignored. This is particularly useful to give the requester insight on the fact that a request is not being processed.

"Notify people" 1206 sends an e-mail notification to the roles, or composed roles, users specify. By default, these roles are evaluated relative to the role of the requester.

"Reassign task" specifies roles or composed roles that will be reassigned automatically to achieve completion of the workflow cycle, if deadline is exceeded or reminders are ignored.

"Abort cycle" 1208 stops workflow and failure is assumed on the current segment.

"Skip" segment if workflow deadline is exceeded. Processing will continue to cycle end.

Using Workflow Conditions

Workflow conditions provide the capability to handle separate execution paths within a workflow cycle. Conditions can be specified in one of the following ways:

1. By the result of the previous workflow action;
2. By the value of a Notes formula on the routed document; and
3. By the organization or role of the requester.

It is also possible to combine any of these evaluation methods by adding more than one condition in a workflow path (cascading conditions).

Previous Result

The condition is executed according to the previous workflow result. Users are able to specify when the condition is to be executed by choosing one of five options from the pick-list, or be more specific by defining explicitly the segments that must succeed/fail to execute the condition.

Whatever: The condition is always executed.

Figure 13:
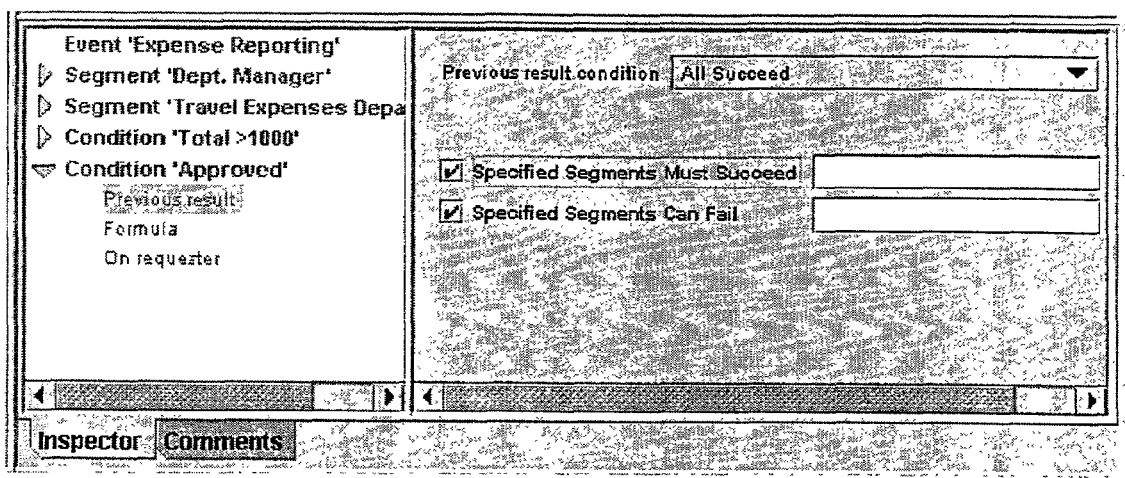
FIG. 13 illustrates the "all succeeded" condition in a workflow process.

All Succeed: All previous segments must succeed to execute the condition. FIG. 13 illustrates this condition.

Any Succeeds and None Fails: No single segment can fail, and at least one segment should succeed, to execute the condition.

Any Succeeds: At least one segment must succeed to execute the condition.

Minimum Success Percentage: User defines minimum percentage of segments that need to succeed in order to execute the condition.

Maximum Failure Percentage: User defines maximum percentage of segments that may fail and still allow execution of the condition.

Formula

Formulas are evaluated against the document that is being routed. In this way, users are able to control workflow routing depending on the current document field values.

Figure 14:
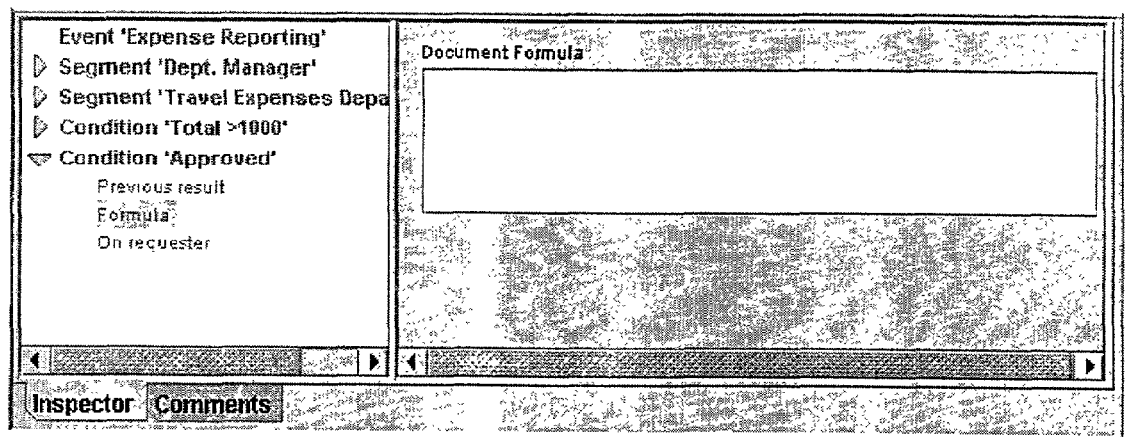
FIG. 14 illustrates a document formula screenshot.

All condition formulas use the Notes formula syntax and will return a true/false statement. FIG. 14 illustrates a document formula screenshot. If the statement result is true, the segment linked to the green area of the condition object will execute. If the result is false, the segments linked to the red area of the condition object will execute.

In the example previously illustrated in FIG. 4, an expense report with an evaluated field greater than 1000 (true statement) would be routed to "Dept. Manager", while an expense report with an evaluated field less than 1000 (false statement) would go directly to the "Travel Expense Department".

Furthermore, condition formulas can be used in three types of conditions: event conditions, execution conditions and branching conditions. An event condition can be found in the event property panel and is useful in determining whether a document is subject to the workflow process. If the condition returns a false statement, no event will be triggered. An execution condition (also called "document formula") is specified in the formula property panel. It controls the execution of a specific workflow step. The example in FIG. 4 illustrates a case of an execution condition.

A branching condition (designated by the field "formula") is located in the workflow segment property panel under routing rules. It allows for including different recipients depending on the document context. It should be noted that branching conditions are used only as recipient filters, and do not affect the execution of a specific segment.

On Requester

Figure 15:
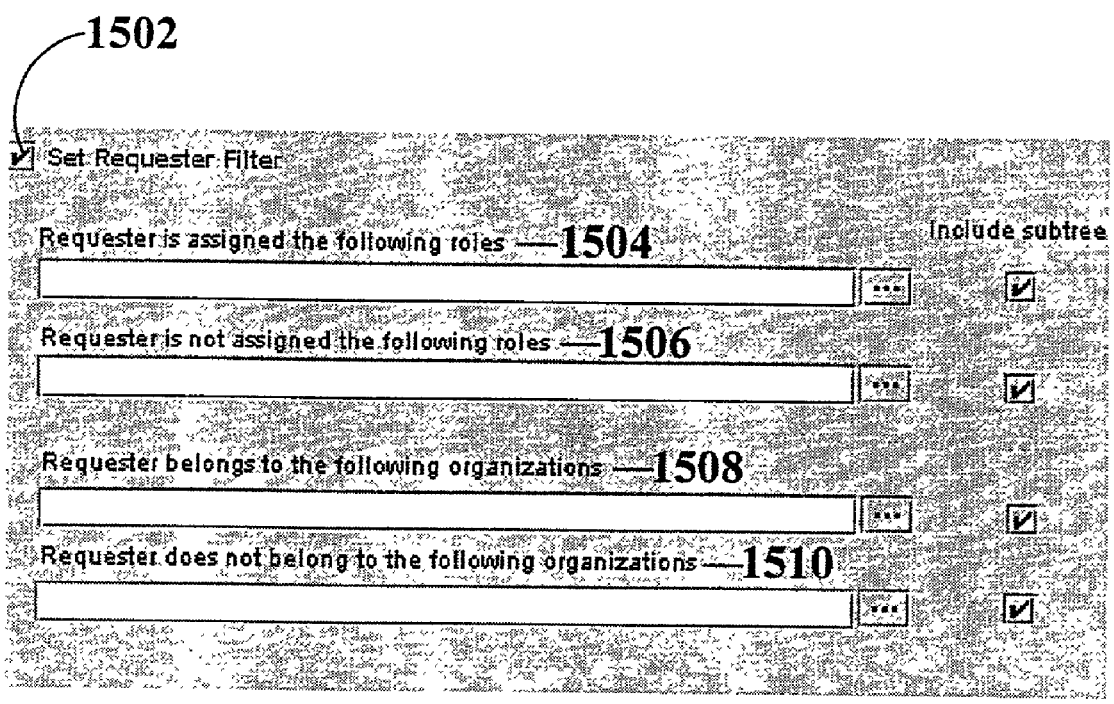
FIG. 15 illustrates a screenshot of a request filter.

FIG. 15 illustrates a screenshot showing how a request filter is set. The workflow router supports exceptions to the standard workflow cycle according to who is actually submitting the document ('requester filter'). The default setting initiates workflow for every requester. However, when the "Set requester filter" option 1502 is selected, the following four options are provided:

- Requester is assigned the following role 1504: Users are able to specify all the roles that are applicable, including sub-roles or just the ones that are specified.
- Requester is not assigned the following roles 1506: This condition acts by excluding requester roles for which the segment applies.
- Requester belongs to the following organizations 1508: If a different path of workflow steps is required depending on the attributes of an organization, users are able to define the organizations from which workflow is to be routed. In this way, it is possible to route workflow differently, depending on which organization the requester belongs to.
- Requester does not belong to the following organizations 1510: Users are able to exclude certain organizations from participating in the same workflow path. In cases where organizations that are actually in charge of handling requests, but perform the request on behalf of other people, this condition is useful.

Using Formulas to Compose Roles

Furthermore, users are able to compose roles from the set of hierarchical and functional roles defined in the planner, by using Notes formula syntax. Composition elements are simple roles except for the innermost element, which may be either be a simple role or more generically a Notes formula that would evaluate to either an array of valid Notes names or roles. When composing roles, the following guidelines should be kept in mind:

1. The Notes Formula syntax should be delimited using braces if the MORSE engine is to interpret the result of the formula as recipients.
2. The Notes Formula syntax should be delimited using square brackets if the result of the formula is to be interpreted as a role.
3. All referenced field names are evaluated according to the routed document.

FIG. 16 illustrates a table describing role evaluation with composed roles.

Using the (+) Sign to Add a Role Constraint to the Role Evaluation

Assume a request is to be sent to an individual that does Accounts Payable, but in addition, a check needs to be performed to make sure that the recipient is at least a line manager. In such a case, users are able to specify to the MORSE engine the role constraint line manager on the evaluation of 'Accounts Payable'. By using the following syntax: "Accounts Payable+Line Manager" users are able to be more specific in the Accounts Payable role evaluation. Any simple role can be used with additional role constraints even when composed. For example: "Accounts Payable+Line Manager (Supplier 1)". This composed role will evaluate to whomever is an accounts payable line manager for supplier 1.

Using Notes Formulas to Build Ad Hoc Workflow Cycles

Managing ad hoc workflow cycles (where the target recipients are defined by the end user prior to submitting the document) is accomplished by creating a field of type names in the form, and subsequently referencing this field between braces (i.e., {field_name}) as a composed role in a workflow cycle routing rules. Users are able to also build semi-ad hoc workflow cycles by applying the same technique for roles that yet need to be evaluated by the MORSE engine at runtime. This is accomplished by using square brackets when referencing the field (i.e., [field_name]).

Creating Subflow Objects in a Workflow Cycle

As described before, workflow cycles can be created once and defined as a sub-flow in multiple business processes. In this way, users are able to re-use common business practices in an organization. Creating subflows is particularly beneficial when one organization's business process have to adapt to changes in separate organizations. In this case, the subflow may be maintained from a central point and would be referenced by other workflow processes, accordingly.

To add a subflow to a workflow cycle, the subflow object is dragged from the toolbar to the desired location in the design area. Subflows are defined from the list of workflow cycles in an Administration database/visual designer. It should be noted that it is necessary to first create the workflow cycle and then define it as a subflow in any number of workflow cycles.

Figure 17:
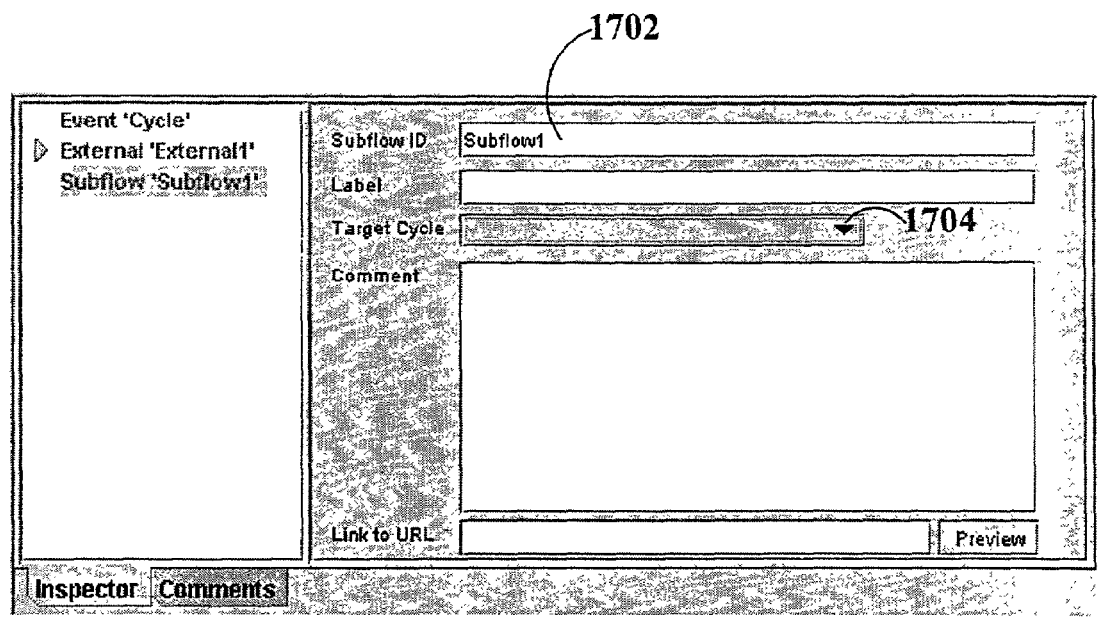
FIG. 17 illustrates a subflow entry that is created automatically in the object inspector.

As shown in FIG. 17, an entry is automatically created in the Object Inspector for the subflow. Users are able to enter a subflow ID (a unique identifier) 1702 and a target workflow cycle from the drop-down box 1704. As mentioned before, all workflow processes saved in the visual designer are available as target cycles. To view the referenced subflow in a workflow cycle, users double-click on the subflow object.

Defining Custom Routing and Notification Options

Flowbuilder allows for customizing routing types and notifications messages that can be used in any number of workflow cycles. This feature allows precise tailoring of workflow automation to meet the specific needs of a business process.

Custom Routing Types

Users are able to create a custom routing type by selecting a set of workflow action model options. To add a custom routing type, users click to expand the "Routing Type" container in the workflow object store, and choose "new object" from the toolbar. The routing types are defined based on the following fields:

1. Routing Type: Naming a custom routing type. This name should be intuitive and easily recognizable for later incorporation in workflow cycles.
2. Activity Label: Describing the action required in a routing type. This instruction will be included in routed document notifications.
3. Document Access: Controlling document access for recipients (i.e., editor, read only).
4. Routing Category: Specifying whether routing requires intervention from the recipient or is used in delivering information to the recipient.
5. Notification Message: Selecting the message that needs to be delivered to the recipient. Users are able to choose from the previously defined message types or create a custom notification.
6. Activity Status Labels: Defining custom labels for the action status of a document that requires user intervention. Users are able to choose either a two-state action status (such as "pending", "done") or a three-state action status (such as "pending", "approved", "denied"). It should be noted that the workflow participant is also able to view the action status.
7. Activity Result Notification: Assigning a notification to be received by the requester for 'success' or 'failure' action states. As with the 'notification message', users are able to create a custom message to be assigned as an activity result notification in later workflow cycles.

Figure 18B:
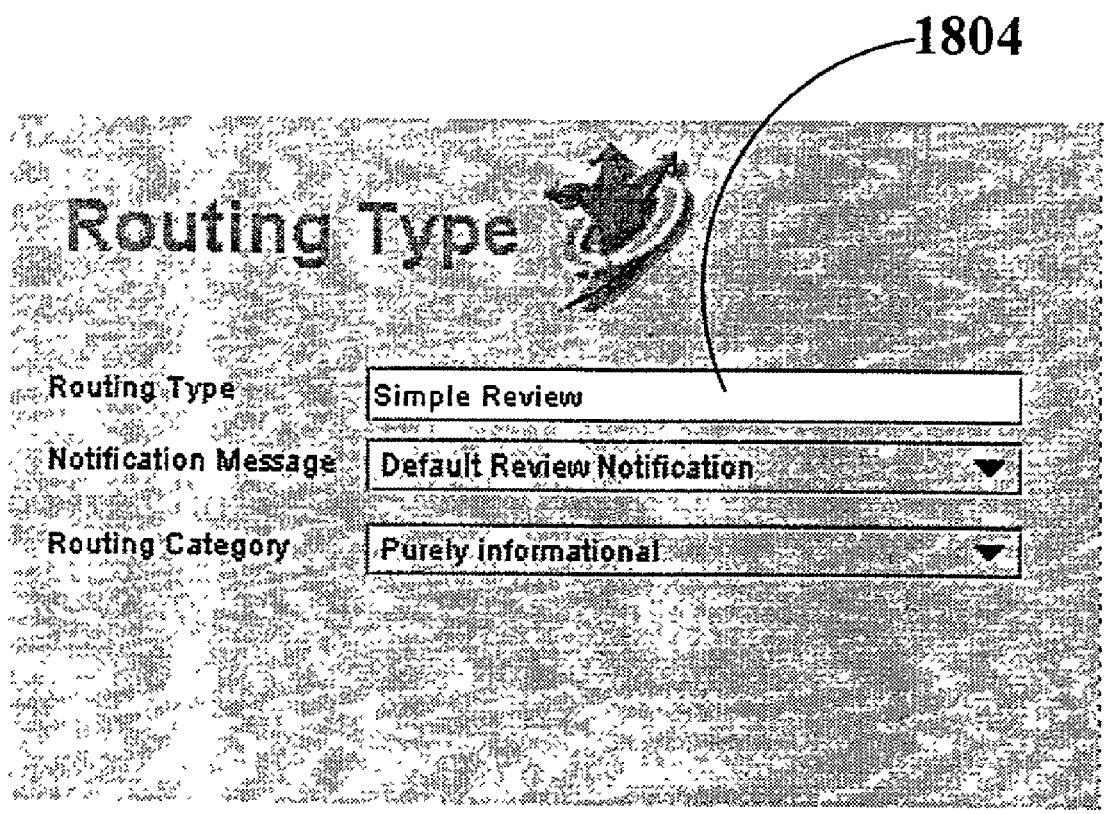
Figure 18D:
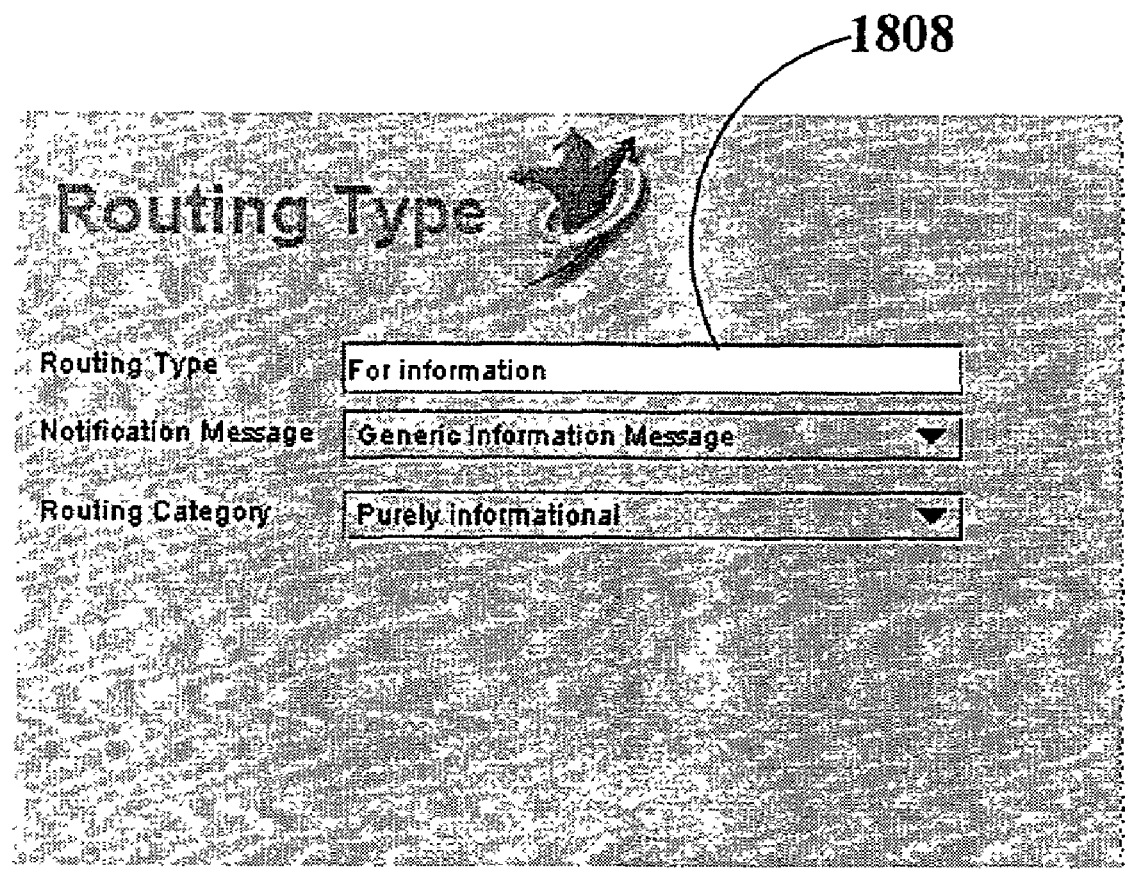

In the example as illustrated in FIG. 18*a*, a routing type is defined for "Combined Approval/Edit" 1802. The routing type is appropriately named to reflect the appropriate action to be taken by requester (in other words, approve and/or edit the routed document). No activity label is added, but a description is added for administrator viewing. This routing type is further assigned a three-state status (pending, approved, denied) and notification messages are selected from the available options. FIGS. 18b–e illustrates various other routing types including: simple review 1804, approval 1806, for information 1808, and review 1810.

Custom Notification Messages

Additionally, users are able to create a custom notification message by populating the subject, body and notification options. To add a custom notification message, users click to expand the "Messages" container in the workflow object store and choose "new object" from the toolbar.

Define the following fields in the object document:
1. Message Id: Name a custom notification message. The ID created will be available in all future workflow cycles, so it is important to name it descriptively.
2. Message description: Allows users to provide more detail to the administrator group regarding usage in future workflow cycles.
3. Subject: Users enter the notification subject that the requester will see in the subject line of their notification email. If an organization has several workflow processes in production, it is helpful to name the workflow event in the subject field for identification purposes.
4. Body: Users enter the body of the notification message to be sent to requester. The body should describe the result of workflow processing and any action the requester should take to complete the business process.

Figure 19C:
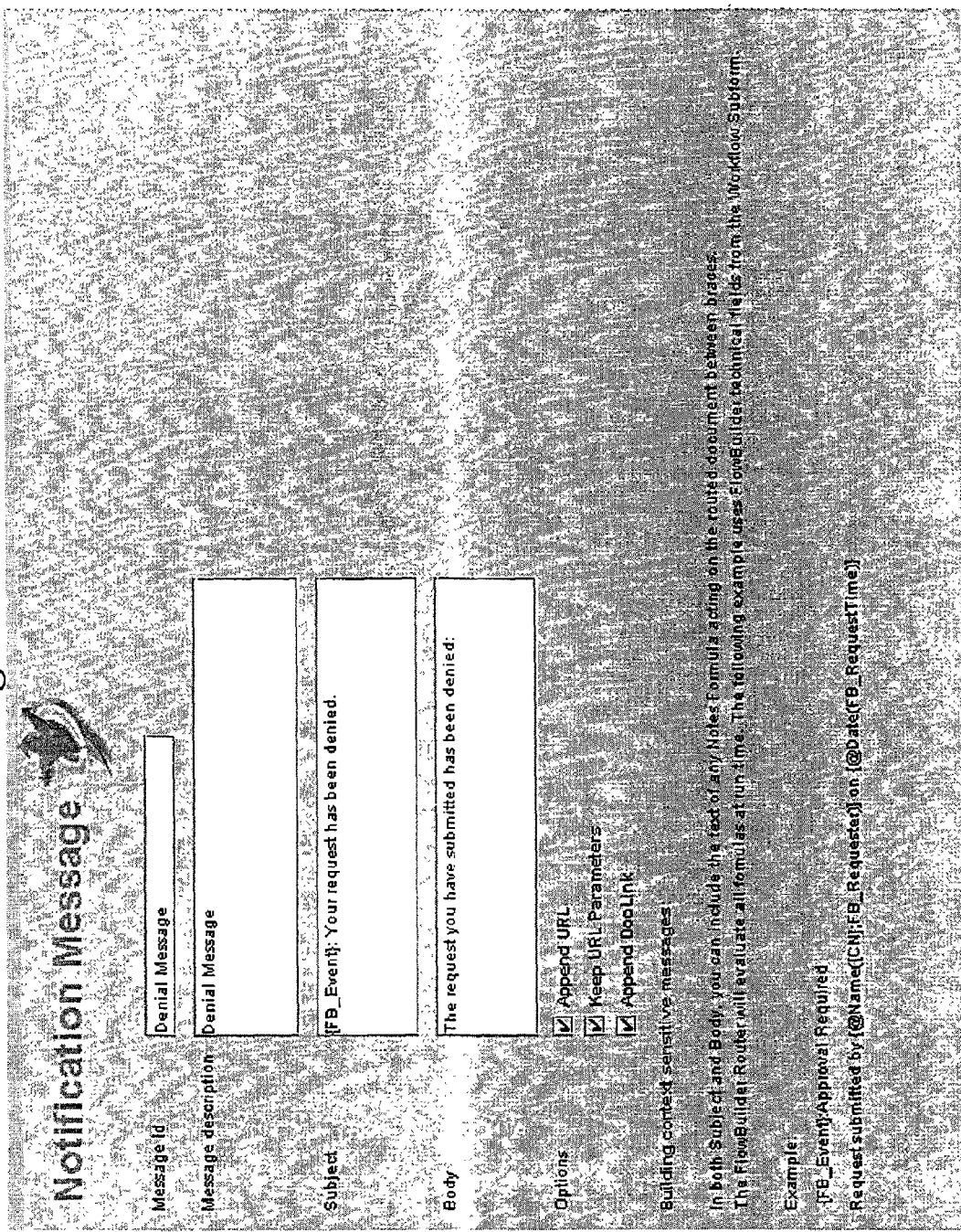
Figure 19D:
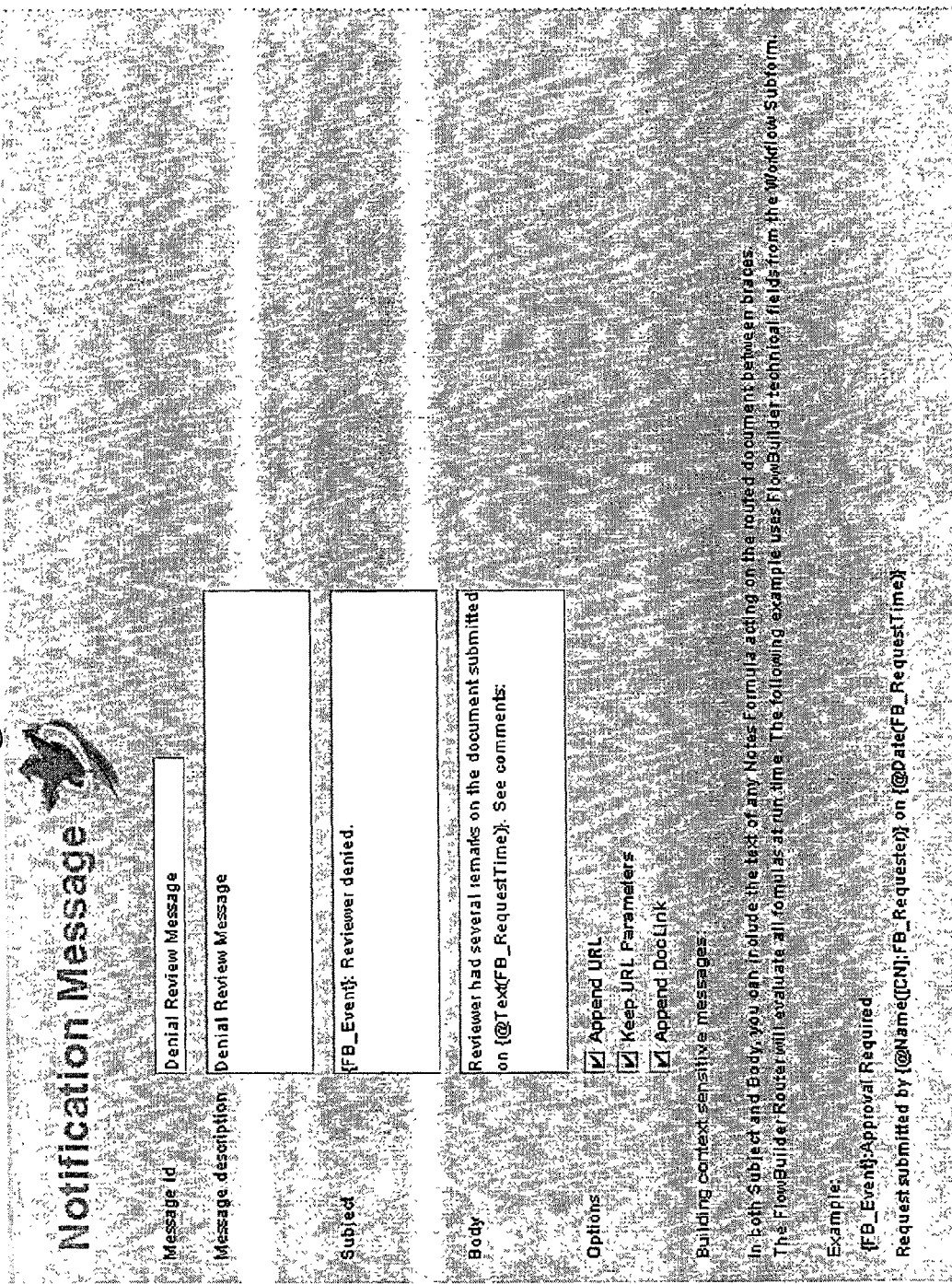
Figure 19E:
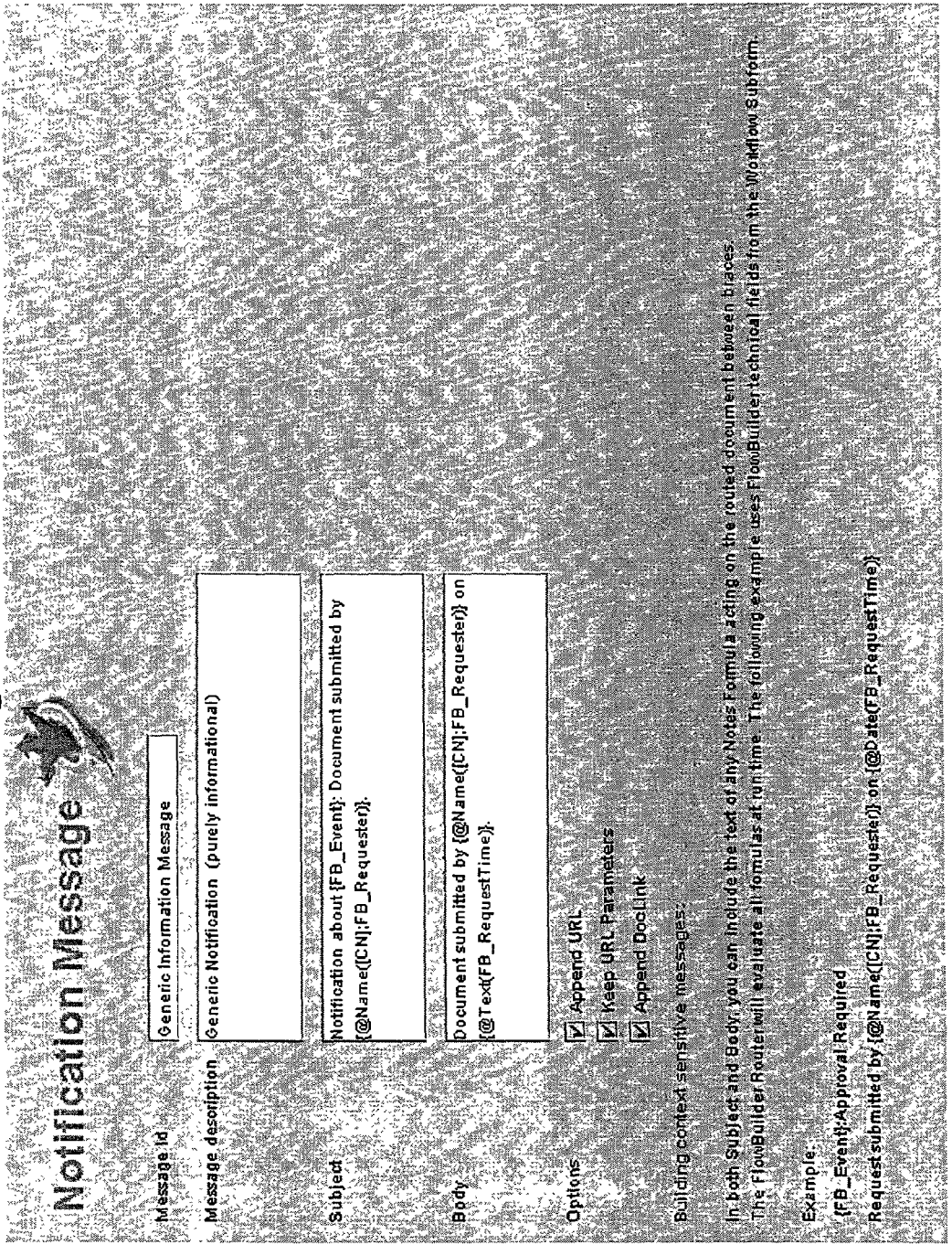
Figure 19H:
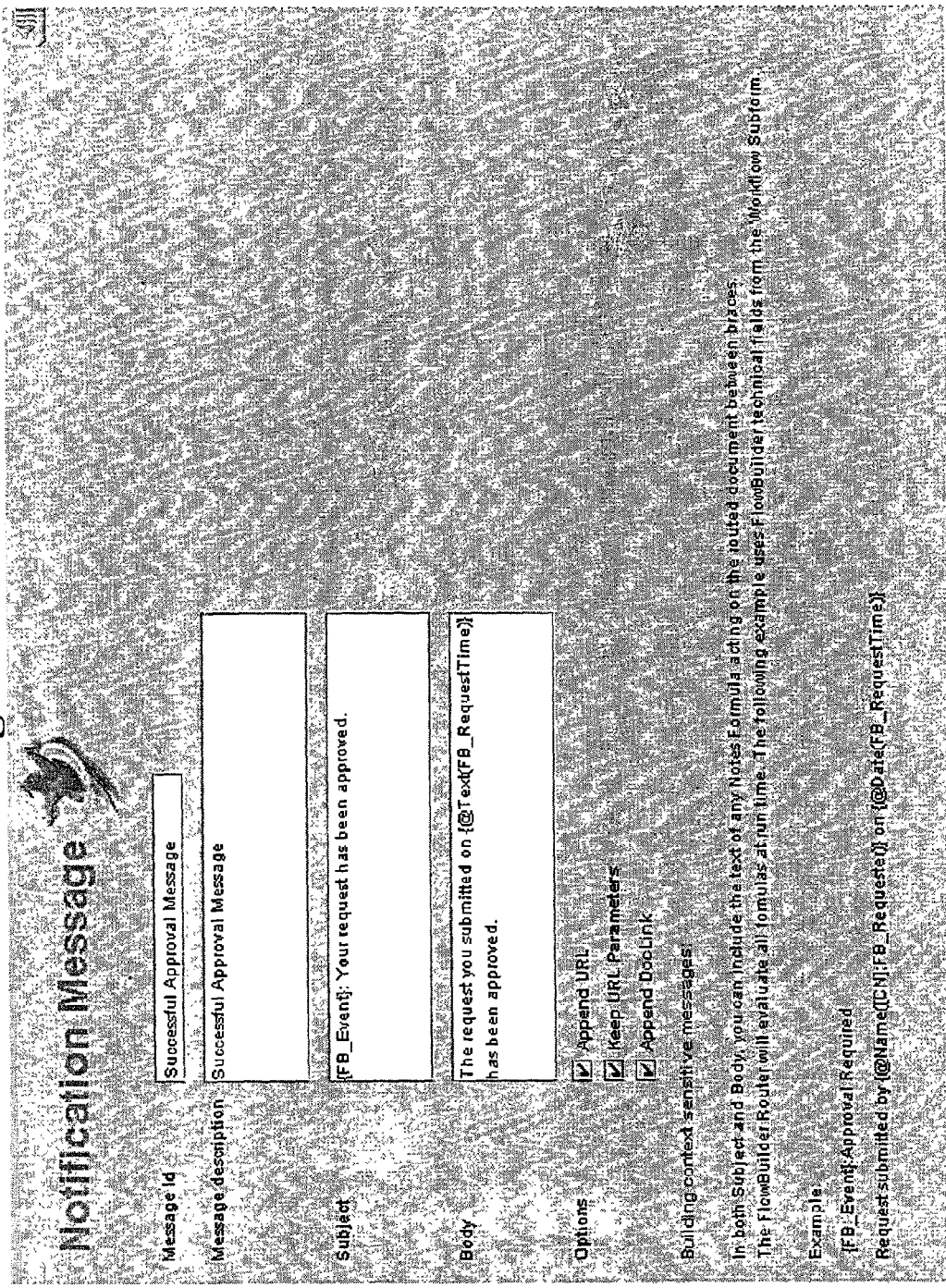
Figure 19I:
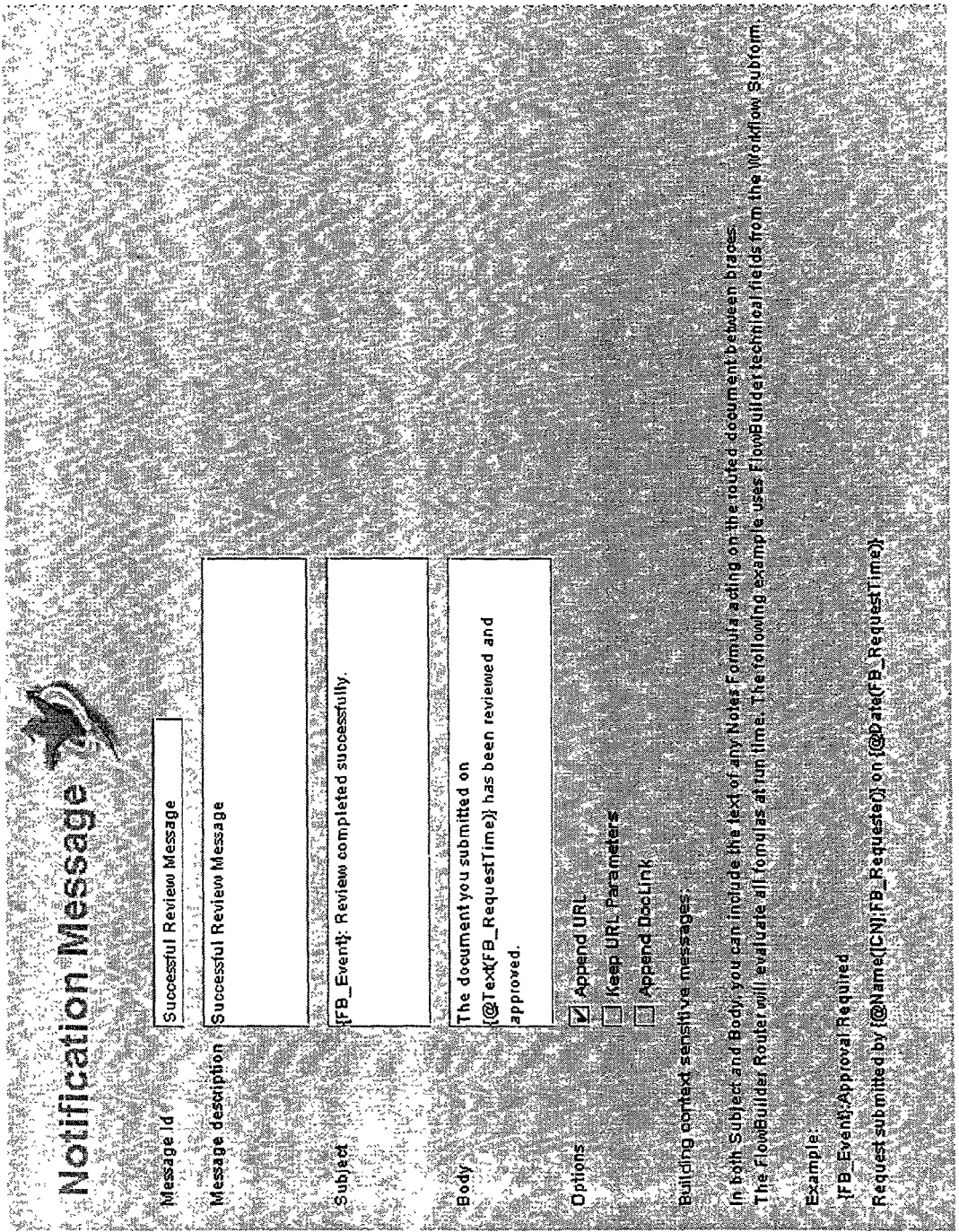

The example illustrated in FIG. 19a shows a custom message defined for notification of approvals. Notice that the subject and body both contain Notes formula syntax that evaluates to fields on the routed document. It should further be noted that users are able to use Notes formulas in the subject and body of notification messages that can act on the routed document to return the appropriate result. FIGS. 19b–i collectively illustrate various notification messages of the visual designer.

For example, as illustrated in FIG. 19a, the subject line will return the field named "{FB_Event}" and insert it in the subject text. The result might be something like "Vacation Request: A request has been approved" in the subject line of the notification. The body in the above example has been defined to return the date and time in which the request was processed.

Validating the Workflow Process

Figure 20:
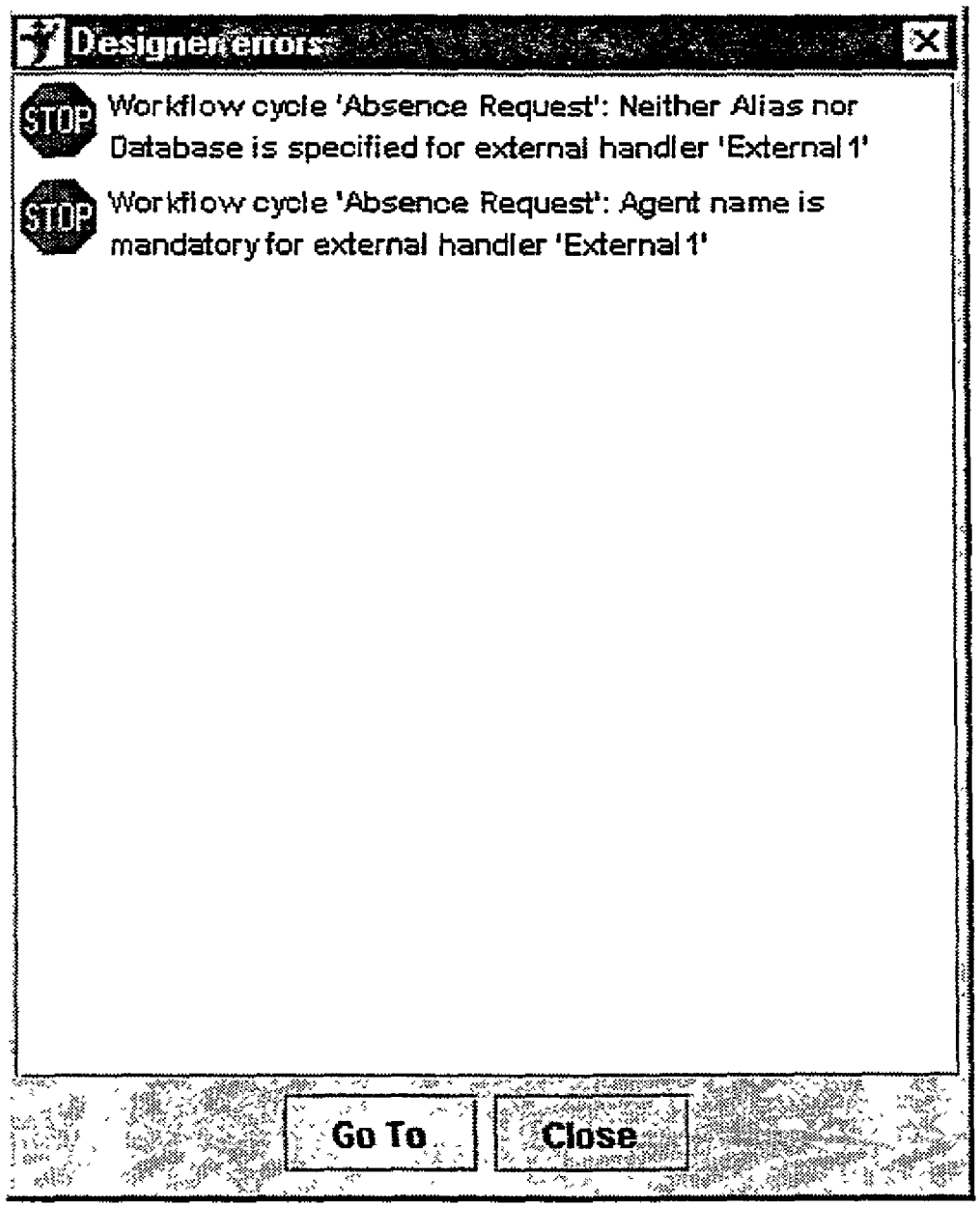
FIG. 20 illustrates the "design errors" screenshot displaying errors associated with a newly designed workflow process.

Before finalizing a workflow cycle, users are required to validate the workflow design. They are able to either validate a process before saving it in the visual designer (choose the validate option from the toolbar), or select the "save all" option to force the validation process. In the instance a process is missing design elements or has any design errors, a "designer errors" window will appear as illustrated in FIG. 20. Users are able to click and highlight the item and click "Go To" to resolve the error. It is possible to save the workflow without resolving all errors by simply closing the designer errors box. However, until a workflow cycle is validated in the visual designer, it cannot be activated for workflow processing. Each time there is a validation error, the process will be automatically de-activated. Once the process has been activated, users choose the "save all" button and if no errors are detected, a complete workflow design is obtained.

Workflow Administration

Flowbuilder provides the tools to administer workflow applications in an organization. Administration of workflow tasks including exception handling, reporting and analysis are handled through the Statistics database. The flowbuilder servlet manager extends administration options allowing workflow administrators the ability to set frequency and priority of workflow processing. When a workflow request is submitted, the router generates a history document and information about the process is stored in the Statistics database.

Figure 21:
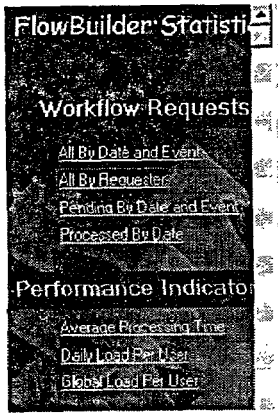
FIG. 21 illustrates a listing of workflow requests by requester.

Workflow requests are organized by standard views in the database, namely, "All By Date and Event", "All By Requester", "Pending By Date and Event" and "Processed By Date". FIG. 21 illustrates workflow requests by requester.

Figure 22:
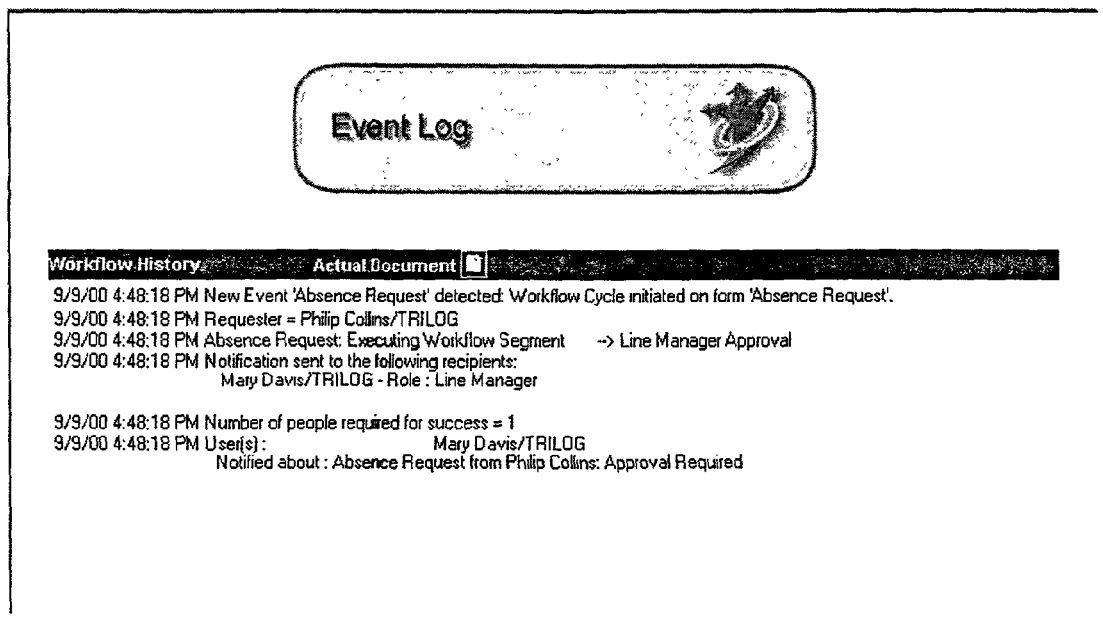
FIG. 22 illustrates an event log for an absence request.

Users are able to view workflow request details by double-clicking on the entry in the database. The Router generates a complete history for each workflow request. Information contained in the event log includes date/time stamp, routing and workflow status. FIG. 22 illustrates an example of the event log for an absence request. By clicking on the "Actual Document" button at the top of the event log, users can view a copy of the original workflow request form.

Furthermore, the Statistics database includes three standard performance indicator views. The workflow history can be viewed in context of:

Average Processing Time showing workflow requests that have run to completion. Information contained in this view is organized by processing time (in hours) and includes event, request date, actor name and status.

Daily Load Per User listing each actor's workflow tasks (pending and complete), by date. Information contained in this view is organized by date and includes information on actor, event, processing information and status.

Global Load Per User displaying all workflow tasks (pending and complete) by actor. Information contained in this view is organized by actor and includes request date, event, processing information and status.

Using the views provided, users are able evaluate workflow status and identify bottlenecks in workflow applications. Additionally, it is possible to create custom views to address specific reporting needs of an organization.

As discussed, history documents contained in Flowbuilder statistics standard reporting views facilitate the monitoring and evaluation of workflow processing. An additional functionality provided by Flowbuilder allows administrators to direct workflow activities outside the defined processing definitions. From the Statistics database, administrators can reassign workflow tasks, restart workflow processing or end current workflow activity.

Reassign Task

Figure 23:
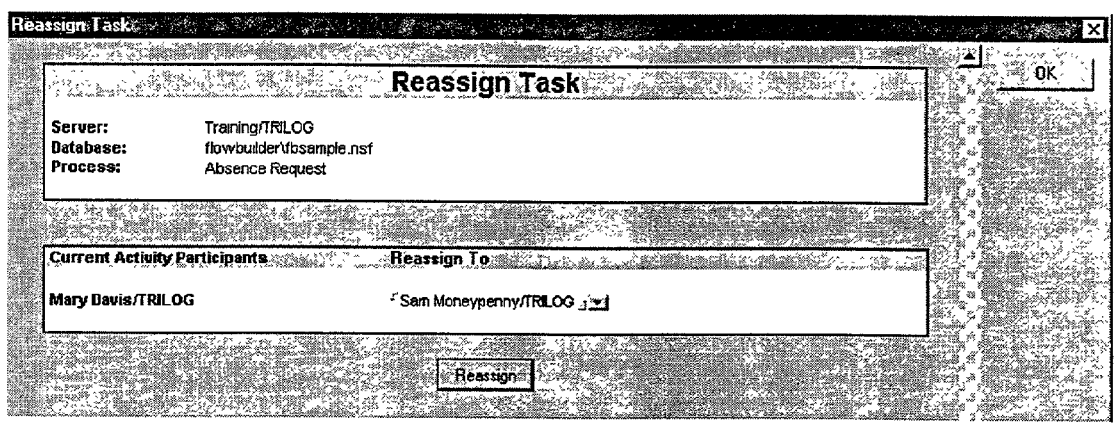
FIG. 23 illustrates a screenshot for reassigning a task in the visual designer.

To reassign a workflow task to another user, users choose <Actions|Workflow Administration|Reassign Task> from the main menu (not shown). Next, they are prompted to select a user for reassignment. Users then click on "Reassign" and close the window by clicking "OK". This is illustrated in FIG. 23. The task will be automatically reassigned to the selected user by temporarily overriding routing definitions contained in the administration database. To verify reassignment, users are able to double-click on the event entry and view the event log. Furthermore, FIG. 23 also illustrates how the "Absence Request" task intended for Mary Davis was reassigned to Sam MoneyPenny.

Restart a Cycle

Figure 24:
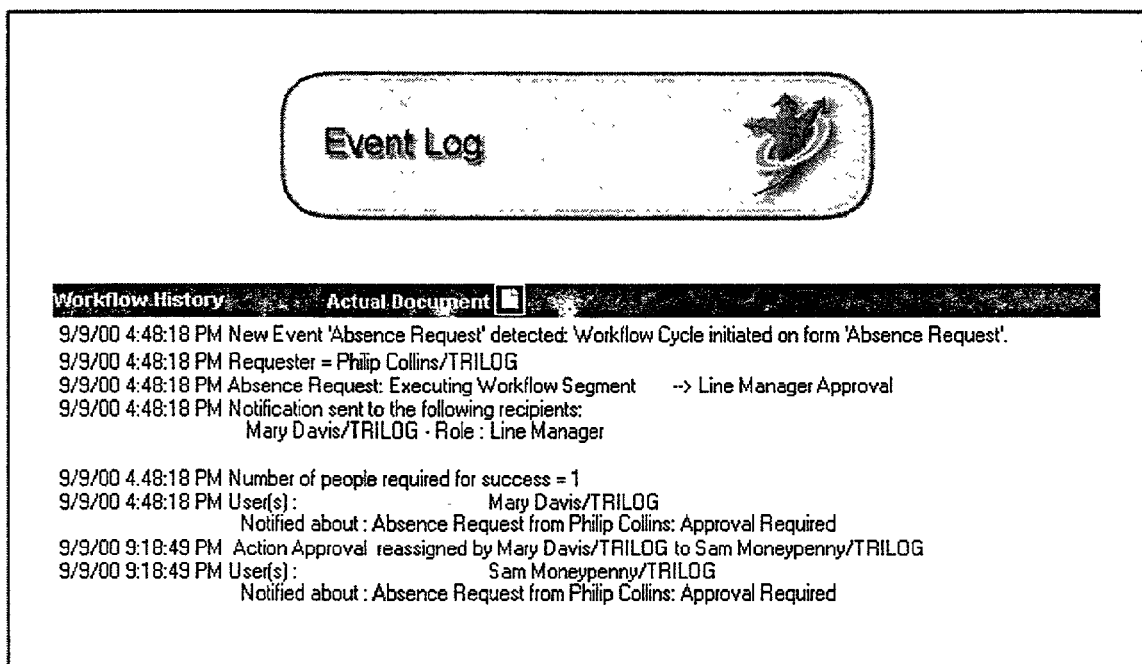
FIG. 24 illustrates a screenshot for restarting a cycle.

To restart a workflow process, users choose <Actions|Workflow Administration|Restart Workflow Cycle> from the main menu (not shown). The workflow cycle instance that is selected is reinitiated and routed according to defined process definitions. It should be noted that the current status changes to "routing shortly", indicating that workflow is restarting. This is illustrated in FIG. 24.

End Current Activity

When ending a workflow cycle, users have the option to override processing and end the workflow event with either a success or failure outcome. To end the current workflow cycle, users choose <Actions|Workflow Administration|End current activity assuming success/failure> from the main menu (not shown). The workflow cycle instance selected will end with the appropriate success or failure status. If multiple levels of action are required (e.g., two approvals), it may be necessary to "end current activity" more than once to bring cycle to completion.

Router Administration

Figure 25:
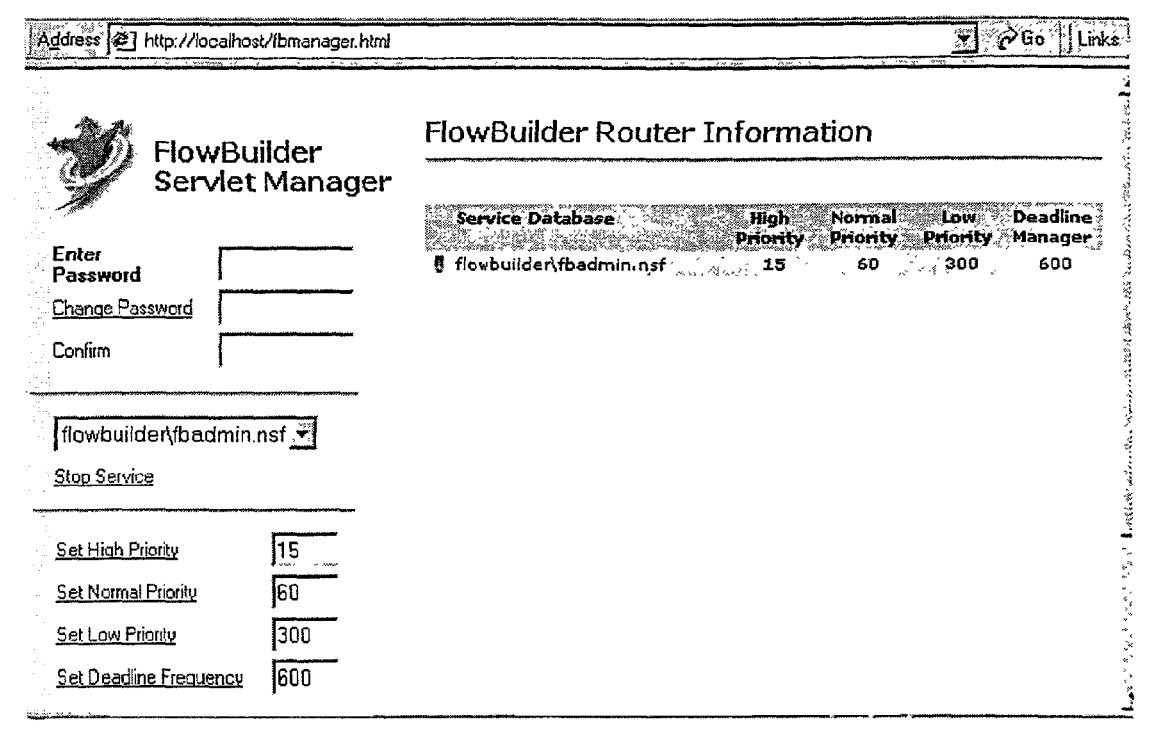

As illustrated in FIG. 25, workflow administrators can set frequency and priority of workflow processing for the router from the flowbuilder servlet manager by accessing the router administration panel from their browser at http://localhost/fbmanager.html.

Thus, the visual designer interface of the present invention allows users/clients to create very complex workflow cycles by simple drag and drop operations. Furthermore, the interface of the present invention allows workflow services to be rendered remotely to external organizations (such as partners, suppliers, distributors and customers) via a network (such as a HTTP network). Moreover, the visual designer interface further allows user/clients to custom create routing types (beyond just approvals and reviews) and assign custom notification messages.

A system and method has been shown in the above embodiments for the effective implementation of a network-enabled workflow system that is integrated with a intelligent search engine. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, or specific computing hardware.

The above enhancements for a network-enabled workflow management system and its described functional elements are implemented in various computing environments. For example, the present invention may be implemented on a conventional IBM PC or equivalent, multi-nodal system (e.g., LAN) or networking system (e.g., Internet, WWW, wireless web). All programming, GUIs, display panels and dialog box templates, and data related thereto are stored in computer memory, static or dynamic, and may be retrieved by the user in any of: conventional computer storage, display (i.e., CRT) and/or hardcopy (i.e. printed) formats. The programming of the present invention may be implemented by one of skill in the art of workflow programming.

Although the present invention has been shown and described with respect to several preferred embodiments thereof, various changes, omissions and additions to the form and detail thereof, may be made therein, without departing from the spirit and scope of the invention.

What is claimed is:

1. A system for designing a network-enabled workflow management module integrated with an intelligent search engine to provide for a real time analysis of workflow processes in an organization, said system comprising:

a workflow segment designer creating one or more work flow steps defining a set of routing rules for one or more resources that trigger said workflow steps;

a sub-flow designer creating one or more sub-flow processes, said sub-flow processes incorporating one or more of pre-existing internal workflow processes;

a condition designer creating one or more workflow conditions based on one or more formulas, said conditions specified in one of the following ways: success, failure, a percentage of a success or a percentage of a failure;

an external process designer creating one or more external process work flow objects, said objects exchanging data with one or more sources external to the organization in said network;

a workflow analyzer analyzing in real-time said one or more workflow processes;

said system creating workflow processes using said workflow segment designer, sub-flow designer, condition designer and external process designer, and said system routing said one or more resources locally and remotely using said set of routing rules and said intelligent search engine, and said system analyzing, via said workflow analyzer, said created workflow process in real-time to optimize work flow functionality, wherein said intelligent search engine is a rules-based engine.

2. A system for designing a network-enabled workflow management module integrated with an intelligent search engine to provide for a real time analysis of workflow processes, as per claim 1, wherein said system further comprising a deadline handler that provides for control of workflow processing times through deadlines.

3. A system for designing a network-enabled workflow management module integrated with an intelligent search engine to provide for a real time analysis of workflow processes, as per claim 2, wherein said deadlines is defined in one of the following ways: based on a value extracted from a form or based on a predefined deadline.

4. A system for designing a network-enabled workflow management module integrated with an intelligent search engine to provide for a real time analysis of workflow processes, as per claim 1, wherein said system further comprises a requestor filter to restrict said routing based on identities of requesters triggering said workflow steps.

5. A system for designing a network-enabled workflow management module integrated with an intelligent search engine to provide for a real time analysis of workflow processes, as per claim 1, wherein said rules associated with said rules engine are stored in a rules database.

6. A system for designing a network-enabled workflow management module integrated with an intelligent search engine to provide for a real time analysis of workflow processes, as per claim 1, wherein said formulas are interpreted using said intelligent search engine to determine appropriate work flow recipients for said one or more resources.

7. A system for designing a network-enabled workflow management module integrated with an intelligent search engine to provide for a real time analysis of workflow processes, as per claim 1 wherein said created workflow processes are stored in a central database for future access by other workflow processes.

8. A system for designing a network-enabled workflow management module integrated with an intelligent search engine to provide for a real time analysis of workflow processes, as per claim 1, wherein said system further comprises a workflow administration manager setting the frequency and priority of said created workflow processes.

9. A system for designing a network-enabled workflow management module integrated with an intelligent search engine to provide for a real time analysis of workflow processes, as per claim 8, wherein said workflow administration manager is implemented using a Java servlet.

10. A system for designing a network-enabled workflow management module integrated with an intelligent search engine to provide for a real time analysis of workflow processes, as per claim 1, wherein said workflow analyzer further comprises a statistical analyzer analyzing workflow history of said workflow processes.

11. A system for designing a network-enabled workflow management module integrated with an intelligent search engine to provide for a real time analysis of workflow processes, as per claim 10, wherein said statistical analyzer further comprises:
   an average processing time estimator calculating an average processing time of each of said one or more, created workflow processes;
   a daily load estimator calculating a daily load associated with each user in said system, and
   a global load estimator calculating the overall load associated with each user in said system.

12. A system for designing a network-enabled workflow management module integrated with an intelligent search engine to provide for a real time analysis of workflow processes, as per claim 1, wherein said network comprises any of the following: local area network (LAN), wide area network (WAN), HTTP network, world wide web (WWW), wireless network, PSTN/PBX network, or Internet.

13. A system for designing a network-enabled workflow management module integrated with an intelligent search engine to provide for a real time analysis of workflow processes, as per claim 1, wherein said remote source accessed by said external process workflow objects is a remote database.

14. A system for designing a network-enabled workflow management module integrated with an intelligent search engine to provide for a real time analysis of workflow processes, as per claim 1, wherein said one or more resources to be routed are further updated by accessing a script library.

15. A system for designing a network-enabled workflow management module integrated with an intelligent search engine to provide for a real time analysis of workflow processes, as per claim 14, wherein said script library is an application programming interface (APT) library.

16. A method for designing a network-enabled workflow management algorithm integrated with an intelligent search engine to provide for a real time analysis of workflow processes in an organization, said method comprising:
   defining one more workflow events that trigger workflow processing;
   building one or more workflow cycles using one or more workflow objects, said step of building said one or more workflow cycle further comprising:
   creating one or more workflow steps defining a set of routing rules for one or more resources that trigger said workflow processing; creating one or more sub-flow processes incorporating pre-existing internal workflow processes;
   creating one or more workflow conditions based on one or more formulas;
   creating one or more external process workflow objects for exchanging data with one more sources external to the organization in said network,
   customizing one or more routing and notification messages so said one or more resources are routed in said workflow cycle based on customized routing types, routing rules, routing options, and notification messages,
   validating said created one or more workflow cycles,
   analyzing said validated one or more workflow cycles in real-time to optimize workflow functionality, and
   statistically analyzing said validated one more workflow cycles.

17. A method for designing a network-enabled workflow management algorithm integrated with an intelligent search engine to provide for a real time analysis of workflow processes, as per claim 16, wherein said method further comprises setting deadline date controlling workflow processing times in said one more workflow cycles.

18. A method for designing a network-enabled workflow management algorithm integrated with an intelligent search engine to provide for a real time analysis of workflow processes, as per claim 17, wherein said deadline date is defined in any of the following ways: with a handling margin that defines a predetermined amount of time said resources are to stay unprocessed in said one or more workflow processes or defined based on an extracted value from a form.

19. A method for designing a network-enabled workflow management algorithm integrated with an intelligent search engine to provide for a real time analysis of workflow processes, as per claim 16, wherein said method further comprises restricting routing based on identities of requestors triggering said workflow processing.

20. A method for designing a network-enabled workflow management algorithm integrated with an intelligent search engine to provide for a real time analysis of workflow processes, as per claim 16, wherein said method further comprises setting the frequency and priority of said created one or more workflow processes.

21. A method for designing a network-enabled workflow management algorithm integrated with an intelligent search engine to provide for a real time analysis of workflow processes, as per claim 16, wherein said step of statistically analyzing said validated one or more workflow cycles comprising:
   calculating an average processing time associated with each of said one or more created workflow processes;
   calculating a daily load associated with each requestor in said one or more work cycles, and
   calculating a global load associated with each requestor in said one or more work cycles.

22. A method for designing a network-enabled workflow management algorithm integrated with an intelligent search engine to provide for a real time analysis of workflow processes, as per claim 16, wherein said network comprises any of the following: local area network (LAN), wide area network (WAN), HTTP network, world wide web (WWW), wireless network, PSTN/PBX network, or Internet.

23. A method for designing a network-enabled workflow management module integrated with an intelligent search engine to provide for a real time analysis of workflow processes in an organization, said method comprising:
   creating one or more workflow processes, said step of creating one or more workflow processes further comprising:
   creating one or more workflow steps defining a set of routing rules for one or more resources that trigger said workflow steps;

creating one or more sub-flow processes, said sub-flow processes incorporating one or more of pre-existing internal workflow processes;

creating one or more workflow conditions based on one or more formulas, said conditions specified in one of the following ways: success, failure, a percentage of a success or a percentage of a failure;

creating one or more external process workflow objects, said objects exchanging data with one or more sources external to the organization in said network, analyzing said created one or more workflow process in real-time to optimize workflow functionality;

routing said one or more resources locally and remotely using said set of routing rules and said intelligent search engine; and controlling workflow processing times through deadlines.

* * * * *